United States Patent
Takagi

(10) Patent No.: US 9,579,791 B2
(45) Date of Patent: Feb. 28, 2017

(54) CONTROL METHOD OF ROBOT APPARATUS AND ROBOT APPARATUS

(71) Applicant: CANON KABUSHIKI KAISHA, Tokyo (JP)

(72) Inventor: Kiyoshi Takagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/699,983

(22) Filed: Apr. 29, 2015

(65) Prior Publication Data

US 2015/0239122 A1    Aug. 27, 2015

Related U.S. Application Data

(63) Continuation of application No. 13/722,514, filed on Dec. 30, 2012, now Pat. No. 9,044,860.

(30) Foreign Application Priority Data

Feb. 13, 2012   (JP) .................................. 2012-028614

(51) Int. Cl.
  *B25J 9/00*   (2006.01)
  *B25J 9/16*   (2006.01)

(52) U.S. Cl.
  CPC .... *B25J 9/1633* (2013.01); *G05B 2219/39201* (2013.01); *G05B 2219/41387* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 4,937,759 A | * | 6/1990 | Vold | B25J 9/1602 700/262 |
| 4,975,856 A | * | 12/1990 | Vold | B25J 9/1602 318/568.19 |
| 5,430,643 A | * | 7/1995 | Seraji | B25J 9/1643 318/568.11 |
| 5,502,363 A | * | 3/1996 | Tasch | B25J 9/12 318/568.1 |

(Continued)

FOREIGN PATENT DOCUMENTS

JP    3436320 B2    8/2003

*Primary Examiner* — Jonathan L Sample
(74) *Attorney, Agent, or Firm* — Fitzpatrick, Cella, Harper & Scinto

(57) ABSTRACT

A control method of a robot apparatus, the robot apparatus including a link and a pair of actuators, obtaining each driving force command value of each of the actuators, and controlling each of the actuators, the control method including: a torque command value computation step; a change computation step of computing a difference between the joint stiffness command value and a value and performing a computation of subtracting a value from the joint stiffness command value; an iterative step of iterating the computations of the torque command value computation step and the change computation step until the difference converges to a value equal to or smaller than a predetermined value; and a driving force command value computation step to compute each of the driving force command values when the difference is converged to a value equal to or smaller than the predetermined value.

12 Claims, 16 Drawing Sheets

(56) References Cited

U.S. PATENT DOCUMENTS

| | | | | |
|---|---|---|---|---|
| 5,648,709 A * | 7/1997 | Maeda | G05B 17/02 | 318/568.1 |
| 5,737,500 A * | 4/1998 | Seraji | B25J 9/1643 | 318/568.11 |
| 5,784,542 A * | 7/1998 | Ohm | B25J 3/04 | 700/247 |
| 7,385,686 B2 * | 6/2008 | Shiba | G01R 31/308 | 356/237.1 |
| 7,657,345 B2 * | 2/2010 | Endo | B25J 9/161 | 318/568.17 |
| 2004/0172165 A1 * | 9/2004 | Iribe | B62D 57/032 | 700/245 |
| 2004/0176875 A1 * | 9/2004 | Iribe | G06N 3/008 | 700/245 |
| 2005/0113973 A1 * | 5/2005 | Endo | B25J 9/161 | 700/245 |
| 2007/0013336 A1 * | 1/2007 | Nowlin | A61B 19/2203 | 318/568.21 |
| 2007/0168081 A1 * | 7/2007 | Shin | B25J 9/08 | 700/245 |
| 2007/0255453 A1 * | 11/2007 | Brogardh | B23Q 1/5462 | 700/245 |
| 2007/0296366 A1 * | 12/2007 | Quaid | B25J 9/1638 | 318/568.16 |
| 2008/0207409 A1 * | 8/2008 | Kadota | A61B 5/1121 | 482/122 |
| 2009/0114053 A1 * | 5/2009 | Mikaelsson | B25J 9/0009 | 74/490.05 |
| 2009/0287354 A1 * | 11/2009 | Choi | B25J 9/1633 | 700/261 |
| 2012/0059518 A1 * | 3/2012 | Lee | B62D 57/032 | 700/261 |
| 2012/0065778 A1 * | 3/2012 | Lim | B62D 57/032 | 700/254 |
| 2012/0072026 A1 * | 3/2012 | Takagi | B25J 9/1075 | 700/261 |
| 2012/0158179 A1 * | 6/2012 | Ooga | B25J 9/1633 | 700/259 |
| 2012/0158182 A1 * | 6/2012 | Lee | B25J 9/162 | 700/261 |
| 2012/0158183 A1 * | 6/2012 | Lim | B25J 9/162 | 700/261 |
| 2012/0316682 A1 * | 12/2012 | Seo | B62D 57/032 | 700/261 |
| 2013/0158712 A1 * | 6/2013 | Lee | G05B 19/04 | 700/261 |
| 2013/0211595 A1 * | 8/2013 | Takagi | B25J 9/1633 | 700/261 |
| 2013/0211596 A1 * | 8/2013 | Takagi | B25J 9/1633 | 700/261 |
| 2013/0345877 A1 * | 12/2013 | Kose | B25J 9/1633 | 700/260 |
| 2014/0114479 A1 * | 4/2014 | Okazaki | B25J 13/085 | 700/253 |
| 2015/0005941 A1 * | 1/2015 | Milenkovic | B25J 9/163 | 700/262 |

* cited by examiner ary cooperative work of a robot apparatus and a human can be realized, and fitting work of components is facilitated by controlling the direction of the flexibility of the hand. If the method is applied to a legged mobile robot, impact on the body can be alleviated by soft landing, and absorption of a difference in level allows stable walking on an unleveled land.

CONTROL METHOD OF ROBOT APPARATUS AND ROBOT APPARATUS

This application is a continuation of application Ser. No. 13/722,514, filed Dec. 20, 2012 (allowed), the contents of which are incorporated by reference herein.

BACKGROUND OF THE INVENTION

Field of the Invention

The present invention relates to a control method of a robot apparatus including a hand that can flexibly touch an object and to the robot apparatus. The present invention can be applied to a working robot and a legged mobile robot.

Description of the Related Art

In a control method of a manipulator, it is becoming more important that a hand be able to flexibly touch an object. If the method is applied to an industrial robot, cooperative work of a robot apparatus and a human can be realized, and fitting work of components is facilitated by controlling the direction of the flexibility of the hand. If the method is applied to a legged mobile robot, impact on the body can be alleviated by soft landing, and absorption of a difference in level allows stable walking on an unleveled land.

To realize the control of the flexibility of the hand, impedance control for installing a force sensor on the hand or control using artificial muscle actuators is performed. Muscles of a human are known to serve as actuators, and at the same time, serve as a viscoelasticity-variable control mechanism. Among the artificial muscles, pneumatic rubber artificial muscles represented by McKibben artificial muscles particularly have similar viscoelasticity characteristics as those of the human muscles. Therefore, the control of the softness of artificial muscle actuators arranged on a manipulator allows touching an object at arbitrary flexibility of hand. However, the artificial muscle actuators are known to have difficulties in controllability for reasons that the viscoelasticity characteristics indicate non-linearity and that the actuators need to be antagonistically arranged and controlled because the force is generated only in a contraction direction.

Regarding this, disclosed is a technique for generating feedforward input for simultaneous control of a joint angle and flexibility of hand using a model of a manipulator with viscoelasticity characteristics of muscles and using a corrected value calculation unit (see Japanese Patent No. 3436320). In Japanese Patent No. 3436320, the model is used to output a joint angle and viscoelasticity coefficients of artificial muscle actuators at the time of control input, and the joint angle and a target value are compared. An error between the joint angle and the target value is back-propagated to the corrected value calculation unit to correct the feedforward input. Operation of providing the corrected feedforward input again to the model is repeated to gradually obtain the feedforward input.

In Japanese Patent No. 3436320, the joint angle and the flexibility of hand are simultaneously controlled by the feedforward control. However, there is no study example for antagonistically driving the artificial muscle actuators by minimum control input. To minimize the control input, hand flexibility corresponding to a target trajectory of the joint angle needs to be taken into account to simultaneously optimize the hand flexibility and the control input. However, the target stiffness of the hand flexibility is provided in advance in the feedforward control of Japanese Patent No. 3436320, and an algorithm for optimizing the hand flexibility is not included.

An object of the present invention is to simultaneously optimize a torque command value and a joint stiffness command value in trajectory control of a joint angle to antagonistically drive links based on minimum driving force command values.

SUMMARY OF THE INVENTION

The present invention provides a control method of a robot apparatus, the robot apparatus including: a link pivotally connected to a base body through a joint; and a pair of actuators that generate driving force for pulling the link in opposite directions relative to the base body to provide torque to the joint based on a difference in the driving force and to provide stiffness to the joint based on a sum of the driving force, the robot apparatus obtaining each driving force command value of each of the actuators necessary for a joint angle of the joint to follow a target trajectory, the robot apparatus controlling each of the actuators so that the driving force generated in each of the actuators coincides with each of the driving force command values, the control method including: a torque command value computation step of using the target trajectory, angular velocity of the target trajectory, angular acceleration of the target trajectory, and a joint stiffness command value indicating a total value of the driving force command values to calculate a torque command value indicating the torque necessary for the joint based on inverse dynamics of the link; a change computation step of computing a difference between the joint stiffness command value and a value, which is obtained by dividing an absolute value of the torque command value by a moment arm radius of the link, and performing a computation of subtracting a value, which is obtained by multiplying the difference by a coefficient greater than 0 and equal to or smaller than 1, from the joint stiffness command value to change the joint stiffness command value; an iterative step of iterating the computations of the torque command value computation step and the change computation step until the difference converges to a value equal to or smaller than a predetermined value; and a driving force command value computation step of using the joint stiffness command value and the torque command value to compute each of the driving force command values when the difference is converged to a value equal to or smaller than the predetermined value.

According to the present invention, the iterative computation algorithm for simultaneously optimizing the stiffness of the joint and the trajectory of the joint can generate feedforward input for antagonistically driving the actuators based on minimum driving force command values relative to the target trajectory. The minimization of the driving force command values can minimize, for example, an amount of consumed air in the McKibben artificial muscles. This can extend the operating time in a robot apparatus that uses an on-board air supply such as a tank.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
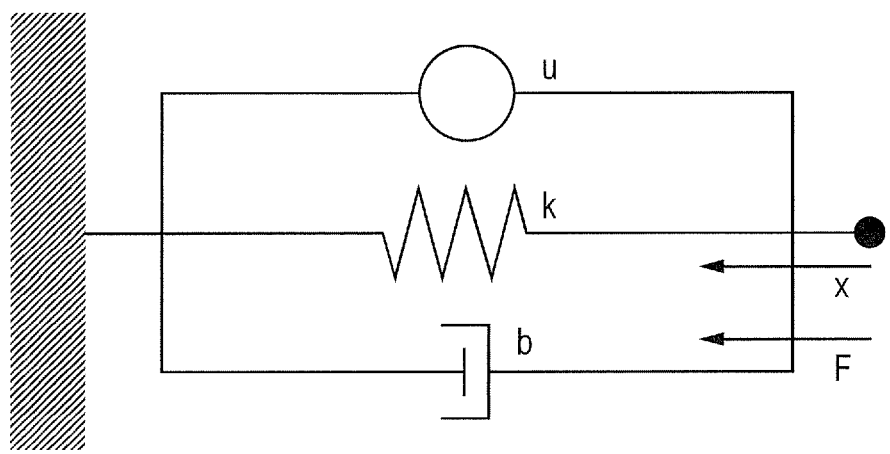
FIG. 1 is a diagram illustrating a viscoelasticity model of a muscle.

FIG. 1 is a diagram illustrating a viscoelasticity model of an actuator applied to a robot apparatus according to a first embodiment of the present invention. The present first embodiment describes an example of simultaneous control of a joint angle and stiffness of a joint of a manipulator using pneumatic artificial muscle actuators in a robot apparatus.

(1) Modeling

The artificial muscle actuator is an actuator with characteristics similar to characteristics called viscoelasticity of muscle. As illustrated in FIG. 1, the artificial muscle actuator is modeled using a force generation element, an elasticity element and a viscosity element. Contractile force of the force generation element is defined as u, and an amount of contraction of muscle is defined as x wherein a contraction direction is positive. The following formula denotes a contractile rate.

$$\dot{x}$$

An elastic force constant is defined as k, a viscous force constant is defined as b, and muscle contractile force is defined as F. In this case, viscoelasticity characteristics of muscle are modeled as follows.

$$F = u - kux - bu\dot{x} \quad (1)$$

This provides a non-linear element in which elastic force and viscous force of muscle contractile force are proportional to the contractile force u of the force generation element.

Figure 2:
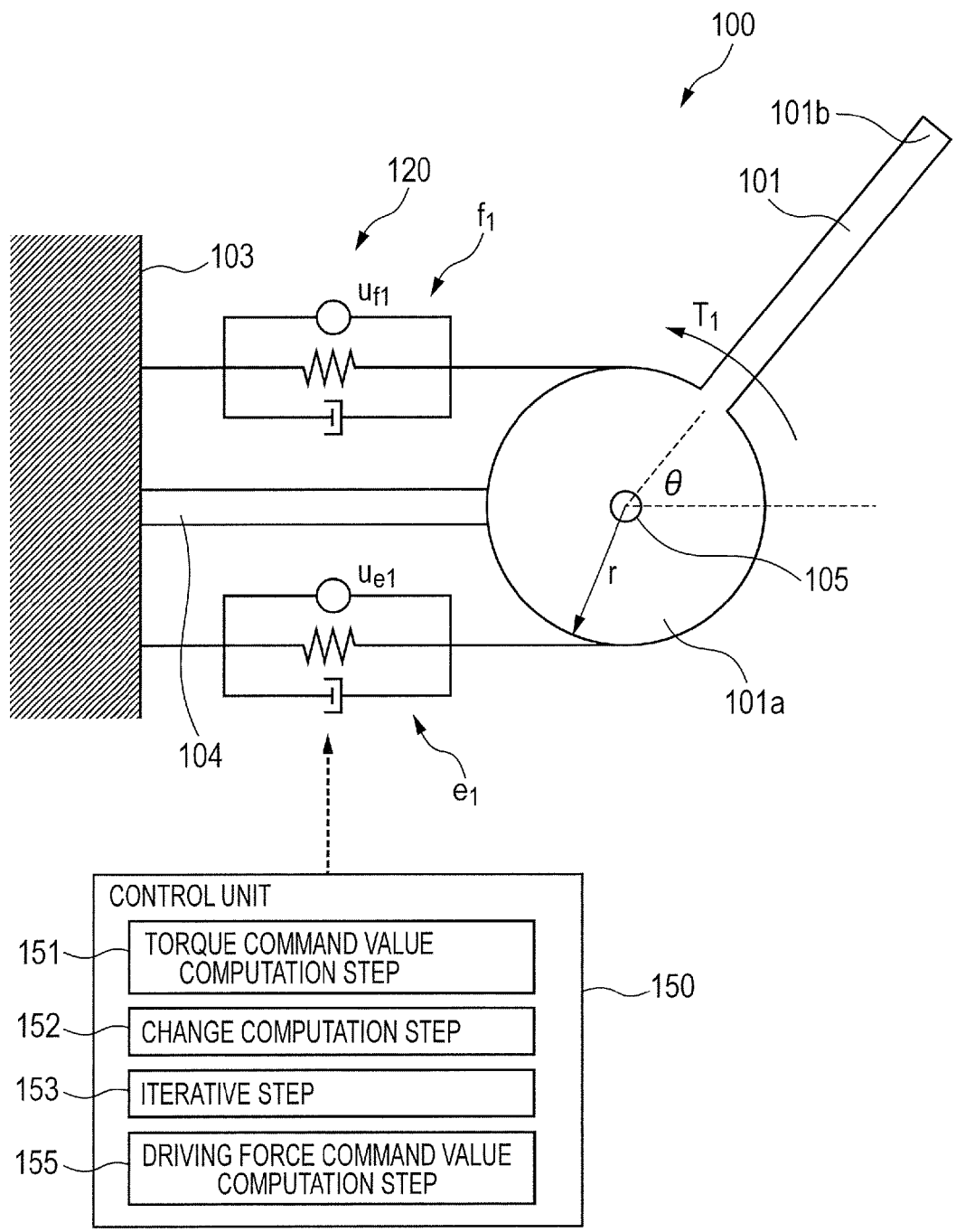
FIG. 2 is an explanatory view illustrating a schematic configuration of a robot apparatus according to a first embodiment of the present invention.

FIG. 2 illustrates a robot apparatus of the present first embodiment. A robot apparatus 100 illustrated in FIG. 2 is a so-called one-link manipulator and includes a link 101, a drive unit 120 with a pair of actuators $e_1$ and $f_1$, and a base body including a base member 103 and a rod-like arm member 104 extending from the base member 103. The link 101 is pivotally connected to the arm member 104 through a joint 105.

Although the base body includes the base member 103 and the arm member 104 as illustrated in FIG. 2 in the description of the present first embodiment, the arrangement is not limited to this. For example, the base body may be another link connected to a body of a legged mobile robot, connected to a pedestal of a working robot, or connected to the link 101.

The actuators $e_1$ and $f_1$ are mono-articular muscle actuators. One end is connected to the base member 103 as the base body, and the other end is connected to a base end 101a of the link 101. The actuators $e_1$ and $f_1$ are antagonistically arranged to swing the link 101 based on a difference in driving force (contractile force). Therefore, the actuators $e_1$ and $f_1$ are symmetrically arranged on both sides of the link 101 across the link 101.

The robot apparatus 100 includes a control unit 150 that sets the driving force of the actuators $e_1$ and $f_1$ based on driving force command values to control operation of the link 101.

The actuators $e_1$ and $f_1$ are pneumatic artificial muscle actuators illustrated in FIG. 1. The artificial muscle actuators generate force only in the contraction direction. Therefore, the actuators are antagonistically arranged as illustrated in FIG. 2 to position the joint 105 at an arbitrary angle. Thus, the actuators $e_1$ and $f_1$ generate driving force that pulls the link 101 in opposite directions relative to the base member. Since the actuators $e_1$ and $f_1$ are mono-articular muscle actuators made of artificial muscles, the driving force is generated by contraction. Therefore, the contractive force of the actuators $e_1$ and $f_1$ coincides with the driving force.

The driving force (contractile force) of force generation elements of the antagonistically arranged actuators $e_1$ and $f_1$ are defined as $u_{e1}$ and $u_{f1}$, respectively. An angle of the link 101 relative to the arm member 104, i.e. an angle of the joint 105 is defined as θ, and inertia moment of the link 101 is defined as I. A moment arm diameter of the link 101, i.e. a length between a pivot center point of the link 101 and a connection point of the actuators $e_1$ and $f_1$ at the link 101, is defined as r. The following Formula (2) denotes an equation of motion.

$$I\ddot{\theta} = (u_{f1} - u_{e1})r - (u_{f1} + u_{e1})kr^2\theta - (u_{f1} + u_{e1})br^2\dot{\theta} \quad (2)$$

It can be recognized that a difference between the contractile force $u_{e1}$ and $u_{f1}$ in the first term on the right side of Formula (2) provides rotation torque to the joint 105, and a sum of the contractile force $u_{e1}$ and $u_{f1}$ in the second and third terms on the right side changes the stiffness and the viscosity relative to the joint 105. Therefore, the actuators $e_1$ and $f_1$ provide torque to the joint 105 based on the difference in the driving force and provides stiffness to the joint 105 based on the sum of the driving force.

(2) Control System Design

The control unit 150 executes a torque command value computation step 151, a change computation step 152, an iterative process 153 and a driving force command value computation step 155. An object of the present first embodiment is to provide feedforward control input for the execution of the driving force command value computation step 155 of calculating the driving force command values $u_{e1}$ and $u_{f1}$ to thereby cause the angle of the joint 105 to follow a target trajectory. In this case, feedforward input that minimizes the contractile force (driving force) is calculated. The target trajectory of the joint 105 is defined as $r_a$. That is, the control unit 150 calculates the driving force command values $u_{e1}$ and $u_{f1}$ of the actuators $e_1$ and $f_1$ necessary to cause the angle θ of the joint 105 to follow the target trajectory $r_a$. The control unit 150 controls the actuators $e_1$ and $f_1$ to cause the driving force generated in the actuators $e_1$ and $f_1$ to be equal to the driving force command values $u_{e1}$ and $u_{f1}$.

(2.1) Feedforward Control System Design

In this section, a derivation method of the feedforward input provided to the actuators $e_1$ and $f_1$ will be described. As described below, the difference between the driving force command values $u_{e1}$ and $u_{f1}$ multiplied by the moment arm diameter r is defined as $T_1$, and the joint stiffness command value indicating the sum (total value) of the driving force command values $u_{e1}$ and $u_{f1}$ is defined as $U_1$.

$$(U_{f1} - u_{e1})r = T_1 \quad (3)$$

$$u_{f1} + u_{e1} = U_1 \quad (4)$$

Since the artificial muscle actuators $e_1$ and $f_1$ generate force only in the contraction direction, the following conditions need to be satisfied at the same time.

$$u_{f1} > 0, u_{e1} > 0 \quad (5)$$

When Formulas (3) and (4) are assigned to Formula (2), the following can be expressed.

$$I\ddot{\theta} = T_1 - U_1 kr^2\theta - U_1 br^2\dot{\theta} \quad (6)$$

It can be recognized that $T_1$ provides torque to the joint 105 and that $U_1$ increases or decreases the stiffness and the viscosity relative to the joint 105.

Therefore, to calculate driving force command values that simultaneously satisfy the torque command value T1 and the joint stiffness command value $U_1$, Formulas (3) and (4) are solved for $u_{e1}$ and $u_{f1}$ to determine as follows.

$$u_{f1} = \frac{U_1 + T_1/r}{2}, u_{e1} = \frac{U_1 - T_1/r}{2} \quad (7)$$

It can be recognized from Formula (7) that the joint stiffness command value $U_1$ can be minimized to minimize the driving force command values $u_{f1}$ and $u_{e1}$ to provide an arbitrary torque command value $T_1$. However, the following conditions can be obtained from Formulas (5) and (7).

$$T_1/r < U_1, T_1/r > -U_1 \quad (8)$$

It can be recognized that the joint stiffness command value $U_1$ needs to satisfy the following condition using the torque command value $T_1$ to provide the artificial muscle actuators $e_1$ and $f_1$ with the driving force command values $u_{f1}$ and $U_{e1}$ only in the contraction direction.

$$|T_1|/r < U1 \quad (9)$$

As for the torque command value $T_1$ for causing the angle of the joint 105 to follow an arbitrary target trajectory $r_a$, angular velocity and angular acceleration of the target trajectory $r_a$ can be expressed by $$\dot{r}_a, \ddot{r}_a$$

or $r_a'$ and $r_a''$, respectively. The torque command value $T_1$ can be expressed by the following Formula (10) based on inverse dynamics of the link 101.

$$T_1 = I\ddot{r}_a + U_1 kr^2 r_a + U_1 br^2 \dot{r}_a \quad (10)$$

Formula (10) includes the joint stiffness command value $U_1$, and as can be recognized from Formula (9), the joint stiffness command value $U_1$ is a command value restricted by the torque command value T. In the present first embodiment, an iterative computation algorithm is used to obtain the torque command value $T_1$ and the joint stiffness command value $U_1$ that simultaneously satisfy Formulas (9) and (10).

Figure 3:
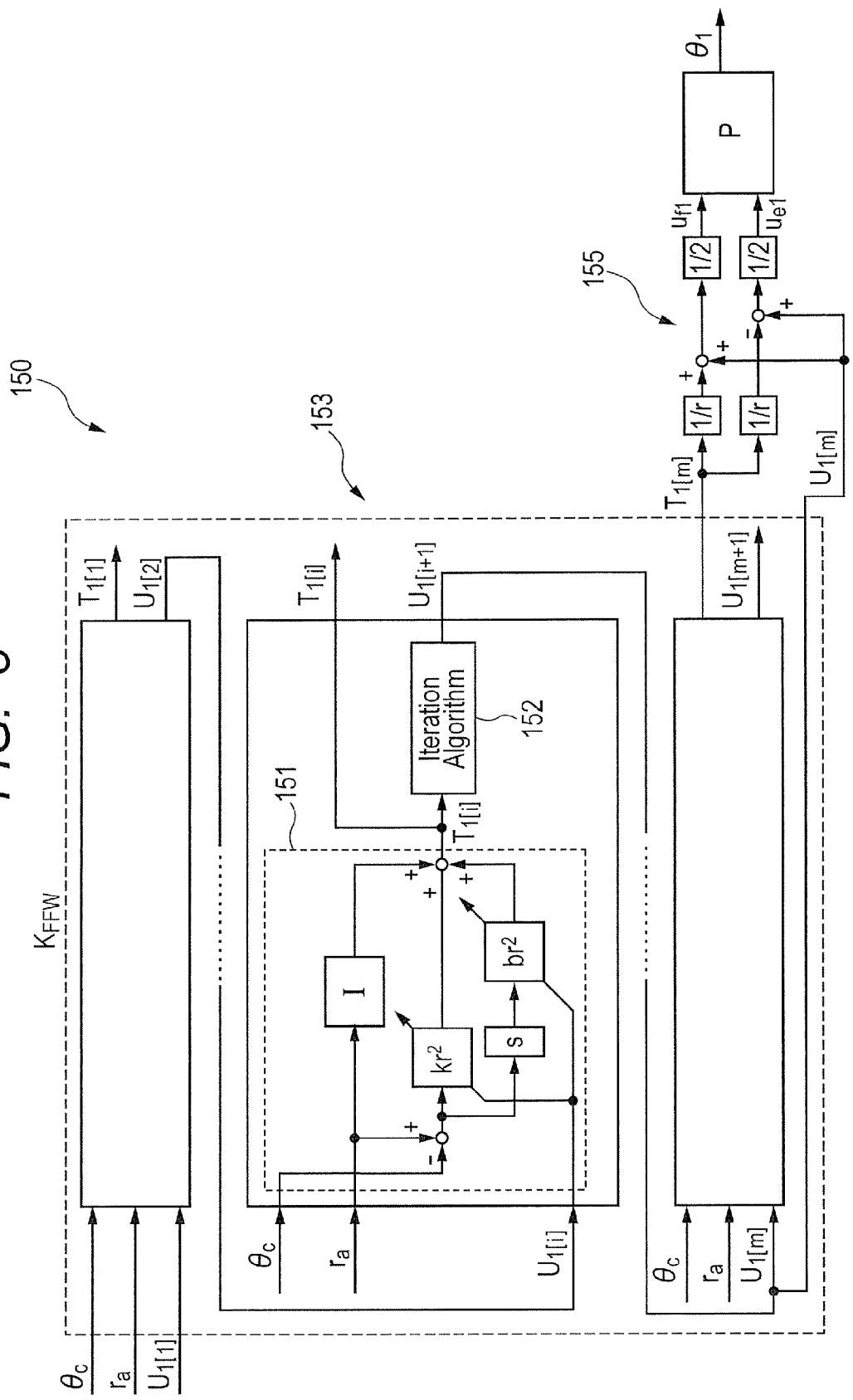
FIG. 3 is a block diagram of a control unit according to the first embodiment of the present invention.

FIG. 3 illustrates a block diagram of a control unit 150 according to the present first embodiment. A block indicated by "Iteration Algorithm" executes the change computation step 152.

In the present first embodiment, the number of iterations is defined as i, and the torque command value $T_1$ and the joint stiffness command value $U_1$ based on iterative computations of i times are written as follows.

$$T_{1[i]}, U_{1[i]} \quad (11)$$

In the torque command value computation step 151, the control unit 150 uses the target trajectory $r_a$, the angular velocity $r_a'$ of the target trajectory, the angular acceleration $r_a''$ of the target trajectory, and the joint stiffness command value $U_{1[i]}$ to compute the torque command value $T_{1[i]}$ indicating the torque necessary for the joint, based on inverse dynamics of the link 101. More specifically, the control unit 150 uses formula (12) to compute the torque command value $T_{1[i]}$ of an i-th iteration (torque command value computation step).

$$T_{1[i]} = I\ddot{r}_a + U_{1[i]} kr^2 r_a + U_{1[i]} br^2 \dot{r}_a \quad (12)$$

In the change computation step 152, the control unit 150 computes a difference between the joint stiffness command value $U_{1[i]}$ and a value $|T_{1[i]}|/r$ obtained by dividing an absolute value of the torque command value $T_{1[i]}$ by the moment arm radius r of the link 101. The difference is defined as $E_{1[i]}$, and the control unit 150 computes the difference $E_{1[i]}$ by the following Formula (13).

$$E_{1[i]} = U_{1[i]} - |T_{1[i]}|/r \quad (13)$$

In the change computation step 152, the control unit 150 performs a computation of subtracting a value, which is obtained by multiplying the difference $E_{1[i]}$ by a convergence factor γ greater than 0 and equal to or smaller than 1, from the joint stiffness command value $U_{1[i]}$ to change the joint stiffness command value $U_{1[i]}$ (change computation step). More specifically, the control unit 150 sets the convergence factor γ of the iterative computation algorithm to $0<\gamma\leq1$ to calculate an i+1-th joint stiffness command value $U_{1[i+1]}$ based on the following Formula (14).

$$U_{1[i+1]}=U_{1[i]}-\gamma E_{1[i]} \quad (14)$$

In the iterative step 153, the control unit 150 iterates the computations of Formulas (12) to (14) for a predetermined number of times m until the difference $E_{1[i]}$ converges to equal to or smaller than a predetermined value (for example, 0) (iterative step).

Since the difference $E_{1[i]}$ is converged to 0, the joint stiffness command value $U_{1[m]}$ is a minimum value satisfying Formula (9), and the torque command value $T_{1[m]}$ using this is a minimum value. Based on this, the feedforward input with the minimum driving force command values $u_{e1}$ and $u_{f1}$ is delivered from Formula (7) as follows.

$$u_{f1} = \frac{U_{1[m]} + T_{1[m]}/r}{2}, u_{e1} = \frac{U_{1[m]} - T_{1[m]}/r}{2} \quad (15)$$

Therefore, in the driving force command value computation step 155, after the iterative process 153, the control unit 150 uses the joint stiffness command value $U_{1[m]}$ and the torque command value $T_{1[m]}$ to compute the driving force command values $u_{f1}$ and $u_{e1}$ (driving force command value computation step).

To set a lower limit for the joint stiffness command value, the following formula can be used in place of Formula (13), wherein a stiffness lower limit is defined as $V_1$.

$$E_{1[i]}=U_{1[i]}-|T_{1[i]}|/r-V_1 \quad (16)$$

Based on Formula (16), the joint stiffness of the manipulator at an arrival angle can be controlled by, for example, adjusting $V_1$ of the target trajectory at arrival time.

When the arrival angle of the target trajectory $r_a$ is defined as $\theta_d$, a torque command value $T_{1d}$ necessary to set the link is as follows.

$$U_1 k r^2 \theta_d \leq T_{1d} \quad (17)$$

However, Formula (9) also needs to be satisfied at the same time. Therefore, the elastic force constant k and the pulley radius r need to satisfy the following condition.

$$kr\theta_d<1 \quad (18)$$

In the derivation described above, it is assumed that the elastic force of muscle is generated in proportion to the angle from θ=0 deg. To generate the feedforward control input with an arbitrary angle as a reference angle (hereinafter, "neutral angle") of the generation of the elastic force of muscle, the following formula (19) can be used in place of Formula (12), wherein $\theta_c$ denotes the neutral angle.

$$T_{1[i]}=I \ddot{r}_a + U_{1[i]}kr^2(r_a-\theta_c)+U_{1[i]}br^2\dot{r}_a \quad (19)$$

(2.2) Trajectory Design

Figure 4:
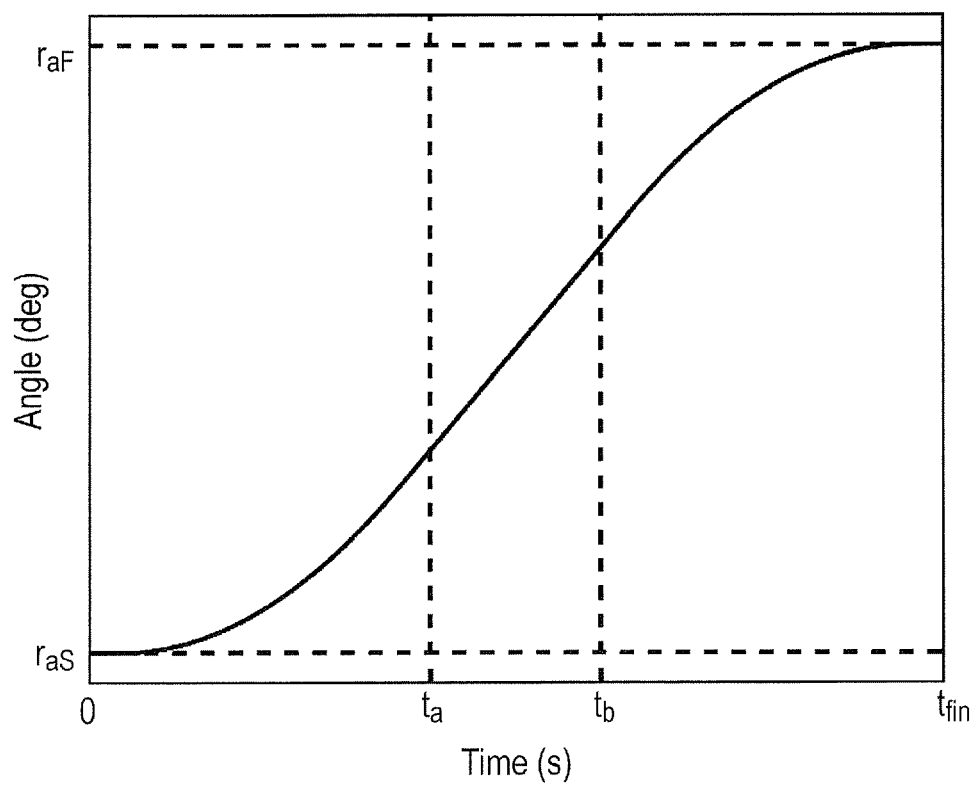
FIG. 4 is a diagram illustrating a target trajectory according to the first embodiment of the present invention.

A design method of the target trajectory $r_a$ of the joint 105 will be illustrated. In the present embodiment, a trajectory including an acceleration section, a constant velocity section, and a deceleration section as illustrated in FIG. 4 is used for the target trajectory $r_a$. Here, $r_{aS}$ and $r_{aF}$ denote an initial angle and a target angle of the trajectory, respectively. Furthermore, $t_a$, $t_b$ and $t_{fin}$ denote a start time of the constant velocity section, an end time of the constant velocity section, and a positioning end time, respectively. Although the trajectory including the acceleration section, the constant velocity section and the deceleration section is used in the present first embodiment, a trajectory without the constant velocity section, such as a minimum jerk trajectory, may also be used.

(3) Simulation

A simulation using the control system of the previous section is performed. The inertia moment of the link is defined by $I=8.3\times10^{-2}$ kgm$^2$, and the moment arm diameter is defined by r=0.1 m. The elastic force and viscous force constants are defined by k=25 and b=3. As for the target trajectory $r_a$, the initial angle is defined by $r_{aS}=-20$ deg, the target angle is defined by $r_{aF}=20$ deg, the start time of the constant velocity section is defined by $t_a=0.4$ sec, the end time of the constant velocity section is defined by $t_b=0.6$ sec, and the positioning end time is defined by $t_{fin}=1$ sec. The joint stiffness command value $U_1$ is delivered to satisfy the restriction illustrated in Formula (9) based on the iterative computation algorithm illustrated in 2.1. The lower limit of the joint stiffness command is set to $V_1=0.02$, and γ=1 is set to perform the iterative computations.

Figure 5A:
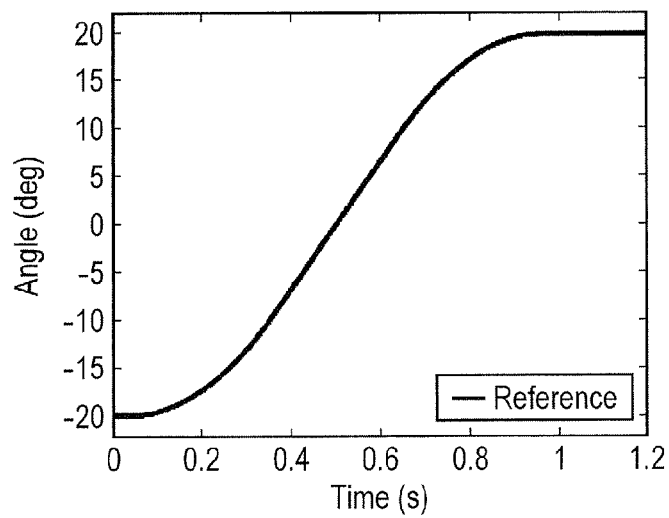
FIG. 5A is a diagram illustrating a simulation result according to the first embodiment of the present invention.
Figure 5B:
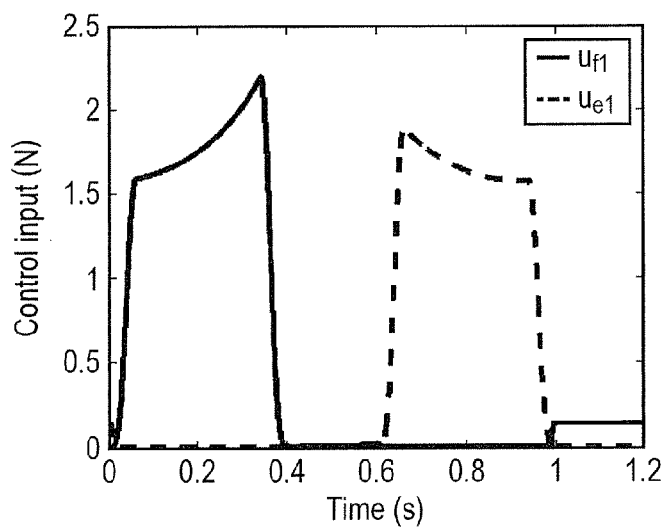
FIG. 5B is a diagram illustrating a simulation result according to the first embodiment of the present invention.
Figure 5C:
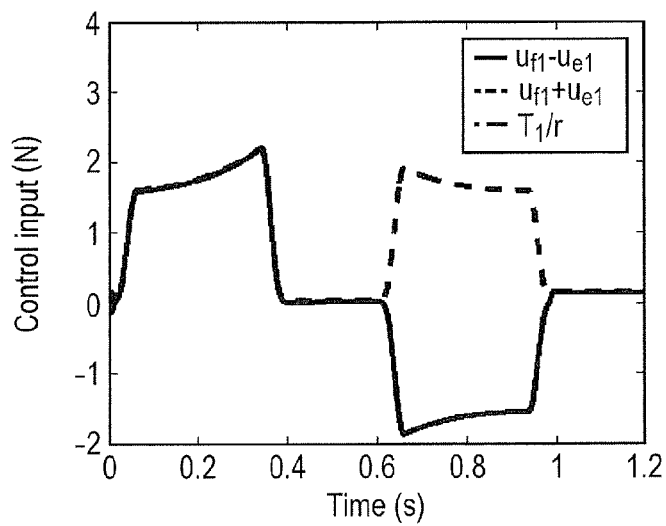
FIG. 5C is a diagram illustrating a simulation result according to the first embodiment of the present invention.

FIG. 5A illustrates the angle θ and the target trajectory $r_a$ of the joint by a solid line and a dashed line, respectively. FIG. 5B illustrates responses of the driving force command values $u_{e1}$ and $u_{f1}$ by a solid line and a dashed line, respectively. FIG. 5C illustrates the difference between the driving force command values $u_{e1}$ and $u_{f1}$ by a solid line, the sum by a dashed line, and a response of $T_1/r$ by an alternate long and short dash line.

It can be recognized from FIG. 5A that the angle θ of the joint 105 indicated by the solid line overlaps with the trajectory $r_a$ illustrated by the dashed line and that the joint 105 follows the target trajectory $r_a$. It can be recognized from FIG. 5B that the characteristic that the contractile force of the artificial muscle can only be a positive value is satisfied, because the driving force command values $u_{e1}$ and $u_{f1}$ are obtained by distributing the control input (torque command value) $T_1$ of the feedforward control system based on the conditions illustrated in Formulas (7) and (9). In FIG. 5C, $u_{f1}-u_{e1}$ indicated by the solid line overlaps with $T_1/r$ indicated by the alternate long and short dash line, and the condition of Formula (3) is satisfied. It can be recognized that $u_{f1}+u_{e1}=U_1$ indicated by the dashed line is in the proximity of the absolute value of $T_1/r$ indicated by the solid line at intervals of $V_1$ and that $u_{f1}+u_{e1}=U_1$ is always a minimum value. It can be recognized that the proposed method of the present first embodiment allows antagonistic drive with the minimum driving force command values $u_{e1}$ and $u_{f1}$ while realizing the following of the target trajectory $r_a$. The minimization of the driving force command values $u_{e1}$ and $u_{f1}$ allows minimizing the amount of consumed air in, for example, the McKibben artificial muscles. As a result, the operating time can be extended in a robot apparatus that uses an on-board air supply such as a tank.

Second Embodiment

A robot apparatus according to a second embodiment of the present invention will be described. In the present second embodiment, control operation by a control unit is different from the control operation by the control unit of the first embodiment. In the configuration of the main body of the robot apparatus, components with similar configurations as those of the main body of the robot apparatus of FIG. 1 described in the first embodiment are designated with the same reference numerals, and the detailed description is omitted.

The present second embodiment delivers a two-degree-of-freedom control system merging the feedforward control system illustrated in the first embodiment and a feedback control system. The feedback control system is delivered to allow simultaneously following the target trajectory and the joint stiffness command values obtained by the iterative computation algorithm. With only the feedforward control system, the control performance deteriorates if there is an identification error in a parameter such as the inertia moment of the link 101. However, it will be illustrated that the configuration of the two-degree-of-freedom control system with the feedback control system allows simultaneous control of the target trajectory and the joint stiffness command values, even if there is a model error.

(1) Modeling

A model used in the present second embodiment is the same as that of the first embodiment.

(2) Control System Design

The delivery of the feedforward control system is similar to that of the first embodiment. The joint torque command $T_{FF[m]}$ delivered by the iterative computation algorithm of the first embodiment is described as $T_{FF}$ in the present second embodiment.

Figure 6:
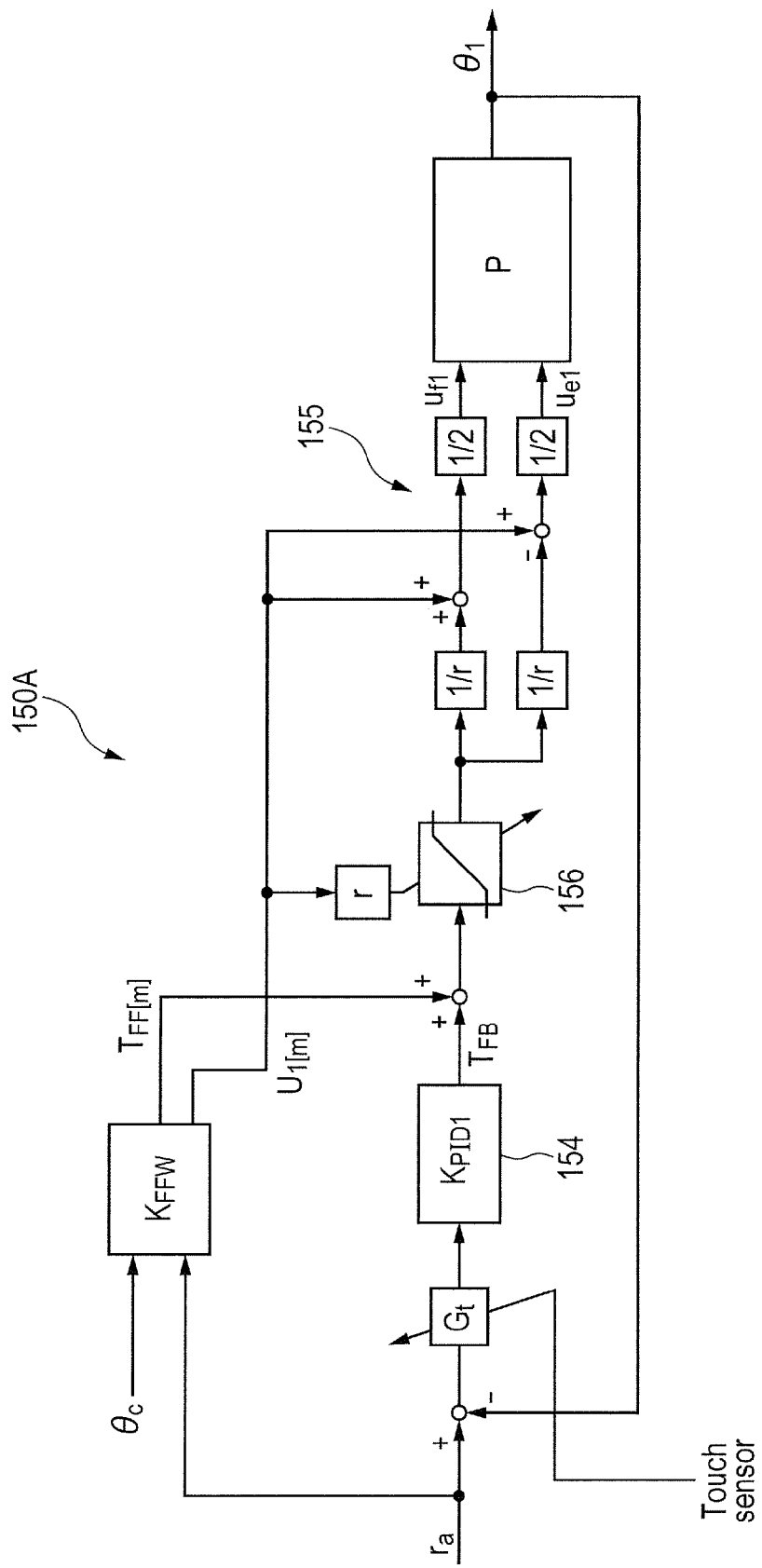
FIG. 6 is a block diagram of a control unit according to a second embodiment of the present invention.

FIG. 6 illustrates a block diagram of a control unit 150A according to the present second embodiment. The section surrounded by the dashed lines in the feedforward control system illustrated in FIG. 3 is indicated by $K_{FFW}$ in FIG. 6.

Other than the feedforward control system $K_{FFW}$, the control unit 150A has a function of executing a PID control step $K_{PID1}$ as a corrected torque command value computation step 154.

In the PID control step $K_{PID1}$, the control unit 150A computes control input torque $T_{FB}$ as a corrected torque command value for compensating the difference between the angle θ and the target trajectory $r_a$ of the joint 105 (corrected torque command value computation step).

Based on Formula (2), if $u_{e1}$ and $u_{f1}$ are determined to satisfy $$(u_{f1}-u_{e1})r=T_{FF}+T_{FB}=T'_1 \quad (20),$$

$T'_1$ as a sum of the feedforward control torque $T_{FF}$ and the feedback control torque $T_{FB}$ can be provided to the joint 105. The torque command value $T'_1$ denotes a computation result obtained by adding the control input torque $T_{FB}$ calculated in the PID control step $K_{PID1}$ to the torque command value $T_{FF}$ calculated in the torque command value computation step 151 (see FIG. 3) of the feedforward control system $K_{FFW}$.

Therefore, in the present second embodiment, the torque command value $T'_1$ is used as a torque command value used to calculate the driving force command values in the execution of the driving force command value calculation step 155.

As in the first embodiment, the driving force command values $u_{e1}$ and $u_{f1}$ need to be determined to simultaneously satisfy the following conditions related to the stiffness of the joint 105.

$$U_1=u_{f1}+u_{e1}=U_{1[m]} \quad (21)$$

To simultaneously satisfy the torque command value $T'_1$ and the joint stiffness command value $U_1$, Formulas (20) and (4) can be solved for the driving force command values $u_{e1}$ and $u_{f1}$ to determine as follows.

$$u_{f1}=\frac{U_1+T'_1/r}{2}, u_{e1}=\frac{U_1-T'_1/r}{2} \quad (22)$$

However, the artificial muscle actuators $e_1$ and $f_1$ generate force only in the contraction direction. Therefore, as in the first embodiment, $T'_1$ needs to satisfy the following condition.

$$-U_1 r < T'_1 < U_1 r \quad (23)$$

As a result, the stiffness of the joint 105 coincides with the joint stiffness command value $U_1$, and at the same time, the joint 105 is followed and controlled at the target angle $r_a$ based on the torque command value $T'_1$. As illustrated in the block diagram of FIG. 6, the control unit 150A can execute a restriction process 156 of restricting the control input as follows to realize Formula (23).

$$|T'_1|<U_1 r \quad (24)$$

Alternatively, there is a method of changing the gain of the PID control step $K_{PID1}$ to set the size of the control input within the range of Formula (23).

The first embodiment has illustrated that the stiffness lower limit $V_1$ can be set to control the joint stiffness. However, if the gain of the feedback control system is high, the stiffness of the joint 105 becomes dominant.

Therefore, as illustrated in FIG. 6, the control unit 150A introduces a touch gain $G_t$. If there is a touch, $G_t=0$ is set to cut off the feedback system. As a result, the stiffness of the link 101 can be quickly switched to the joint stiffness command value $U_1$ at arbitrary time, such as at the detection of contact to a human or an object by the hand.

In the present second embodiment, a transfer function used in the PID control step $K_{PID1}$ is as follows.

$$K_{PID1}(s)=\left(25+\frac{7}{s}+\frac{5s}{1/(100\times 2\times\pi)s1}\right) \quad (25)$$

(3) Simulation

The control system delivered in the previous section is used to perform a simulation. It is assumed that the parameters of the link 101 and the target trajectory $r_a$ are similar to those of the first embodiment. In the present second embodiment, to verify the control performance for the identification error of the model, the inertia moment of the link 101 is set to I'=1.05I, and a model with an error relative to the model at the generation of the feedforward control input is used for the simulation. In the present second embodiment, if the lower limit of the joint stiffness command is small as in the first embodiment, the range of the restriction of the feedback control system is reduced. As a result, a wind-up phenomenon easily occurs. Therefore, $V_1=0.1$ is set to deliver the feedforward input.

Figure 7A:
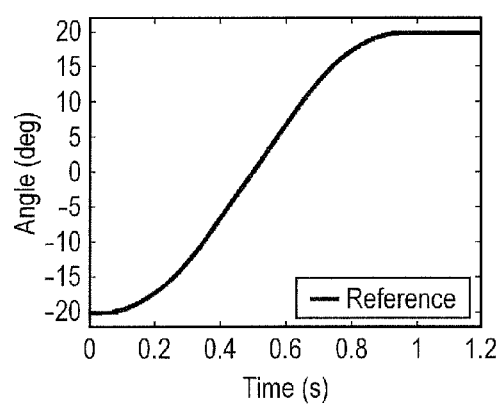
FIG. 7A is a diagram illustrating a simulation result according to the second embodiment of the present invention.
Figure 7B:
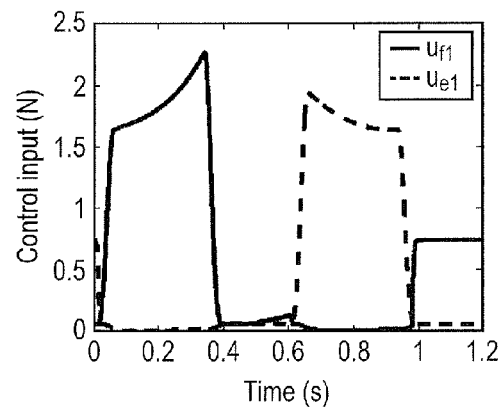
FIG. 7B is a diagram illustrating a simulation result according to the second embodiment of the present invention.
Figure 7C:
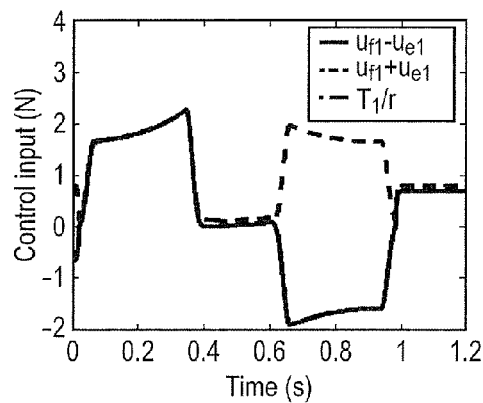
FIG. 7C is a diagram illustrating a simulation result according to the second embodiment of the present invention.
Figure 7D:
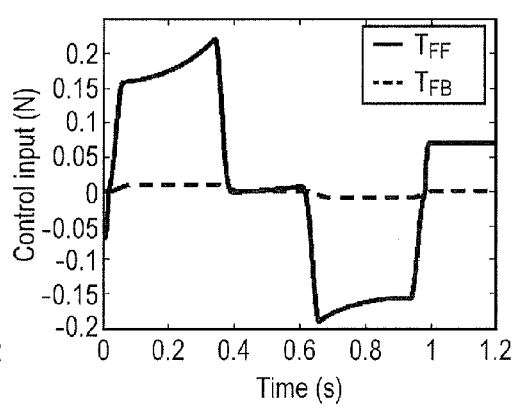
FIG. 7D is diagram illustrating a simulation result according to the second embodiment of the present invention.

FIG. 7A illustrates the angle θ and the target trajectory $r_a$ of the joint 105 by a solid line and a dashed line, respectively. FIG. 7B illustrates responses of the driving force command values $u_{e1}$ and $u_{f1}$ by a solid line and a dashed line, respectively. FIG. 7C illustrates the difference between the driving force command values $u_{e1}$ and $u_{f1}$ by a solid line, the sum by a dashed line, and the response of $T'_1/r$ by an alternate long and short dash line. FIG. 7D illustrates $T_{FF}$ and $T_{FB}$ by a solid line and a dashed line, respectively.

It can be recognized from FIG. 7A that the angle of the joint 105 indicated by the solid line overlaps with the target trajectory $r_a$ indicated by the dashed line and that the joint 105 follows the target trajectory $r_a$. The trajectory cannot be followed only by the feedforward control system due to the model error. However, the feedback control input compensates the model error as illustrated by the dashed line of FIG.

7D, and the trajectory can be followed. It can be recognized from FIG. 7B that driving force command values $u_{e1}$ and $u_{f1}$ satisfy the characteristic that the contractile force of the artificial muscle can only be a positive value, because the control input $T'_1$ of the two-degree-of-freedom control system is distributed based on the conditions illustrated in Formulas (22) and (24). In FIG. 7C, $u_{f1}-u_{e1}$ indicated by the solid line overlaps with $T'_1/r$ indicated by the alternate long and short dash line, and the condition of Formula (20) is satisfied. As in the first embodiment, it can be recognized that $u_{f1}+u_{e1}=U_1$ indicated by the dashed line is in the proximity of the absolute value of $T'_1/r$ indicated by the solid line and is always a minimum value in the range satisfying the restriction of Formula (24). According to the two-degree-of-freedom control system illustrated in the present second embodiment, it can be recognized that antagonistic driving with the minimum contractile force can be realized while realizing the following of the target trajectory $r_a$, even if there is an identification error in the model.

Third Embodiment

Figure 8:
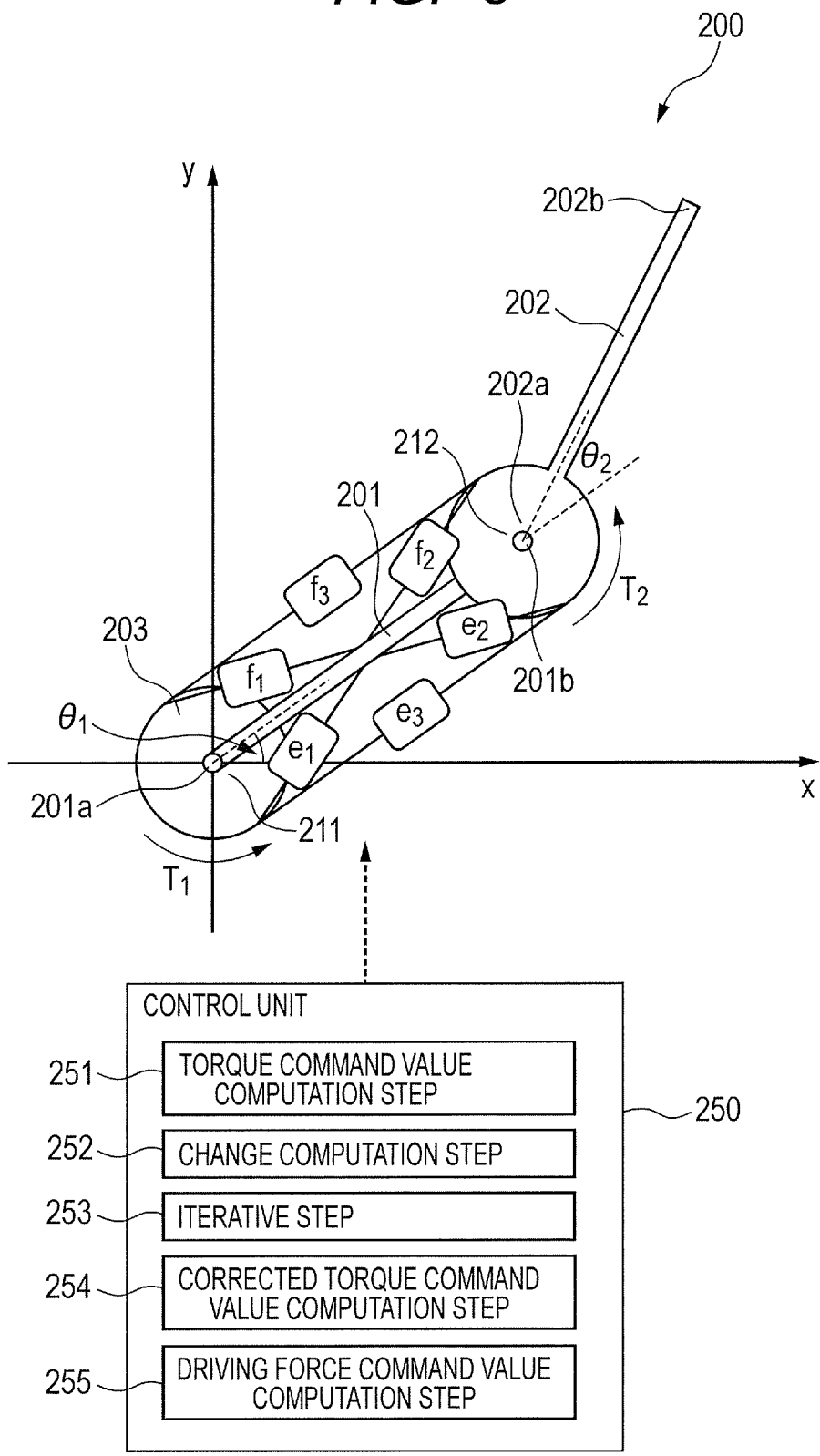
FIG. 8 is an explanatory view illustrating a schematic configuration of a robot apparatus according to a third embodiment of the present invention.

A robot apparatus according to a third embodiment of the present invention will be described in detail. FIG. 8 is an explanatory view illustrating a schematic configuration of the robot apparatus according to the third embodiment of the present invention. The present third embodiment describes an example of control of hand stiffness of a robot apparatus 200 as a two-link manipulator with three pairs (six muscles) of artificial muscle actuators.

(1) Modeling

The robot apparatus 200 illustrated in FIG. 8 includes a pulley 203, a first link 201 pivotally connected to the pulley 203 through a first joint 211, and a second link 202 pivotally connected to the first link 201 through a second joint 212.

The first link 201 is made of a longitudinal member, and a base end 201*a* of the first link 201 is pivotally supported by the pulley 203 in a plane of an x-y rectangular coordinate system (hereinafter, called "work plane"). The second link 202 is made of a longitudinal member, and a base end 202*a* of the second link 202 is pivotally supported by a tip 201*b* of the first link 201 in the work plane.

A tip (hereinafter, called "link tip") 202*b* of the second link 202 includes an end effector (for example, hand) not illustrated. More specifically, the first link 201 is arranged between the first joint 211 and the second joint 212 and is pivotally supported by the first joint 211. The second link 202 is pivotally supported by the second joint 212.

In the present second embodiment, the pulley 203 serves as the base body of the first link 201, and the first link 201 serves as the base body of the second link 202. The pulley 203 is arranged on, for example, the robot body.

The robot apparatus 200 includes a pair of first actuators $e_1$ and $f_1$, a pair of second actuators $e_2$ and $f_2$, and a pair of third actuators $e_3$ and $f_3$. One end of each of the first actuators $e_1$ and $f_1$ is connected to the pulley 203, and the other end is connected to a center section in the longitudinal direction of the first link 201. The first actuators $e_1$ and $f_1$ are antagonistically arranged so that the first link 201 pivots based on the difference in the driving force.

One end of each of the second actuators $e_2$ and $f_2$ is connected to the center section in the longitudinal direction of the first link 201, and the other end is connected to the base end 202*a* of the second link 202. The second actuators $e_2$ and $f_2$ are antagonistically arranged so that the second link 202 pivots based on the difference in the driving force. One end of each of the third actuators $e_3$ and $f_3$ is connected to the pulley 203, and the other end is connected to the base end 202*a* of the second link 202. The third actuators $e_3$ and $f_3$ are antagonistically arranged so that the first link 201 and the second link 202 pivot based on the difference in the driving force. More specifically, the first actuators $e_1$ and $f_1$ are symmetrically arranged on both sides of the first link 201 across the first link 201. The second actuators $e_2$ and $f_2$ are symmetrically arranged on both sides of the first link 201 across the first link 201. The third actuators $e_3$ and $f_3$ are symmetrically arranged on both sides of the first link 201 across the first link 201.

The robot apparatus 200 further includes a control unit 250 that sets the driving force of the actuators $e_1$, $f_1$, $e_2$, $f_2$, $e_3$ and $f_3$ based on driving force command values to control the operations of the links 201 and 202.

The first actuators $e_1$ and $f_1$ are first mono-articular drive actuators that drive the first link 201. The second actuators $e_2$ and $f_2$ are second mono-articular drive actuators that drive the second link 202. The third actuators $e_3$ and $f_3$ are bi-articular simultaneous drive actuators that simultaneously drive the first link 201 and the second link 202. Upper arms and thighs of humans are known to include bi-articular simultaneous drive actuators called bi-articular muscles. The muscle arrangement of the extremities of humans is complicated. An effective muscle concept is introduced, and a two-link model with six muscles (three pairs) is presented.

The actuators $e_1$, $f_1$, $e_2$, $f_2$, $e_3$ and $f_3$ are artificial muscle actuators with viscoelasticity characteristics of muscle illustrated in FIG. 1. The artificial muscle actuators are actuators with characteristics similar to the characteristics called viscoelasticity of muscle. As illustrated in FIG. 1, the muscle is modeled using a force generation element, an elasticity element and a viscosity element.

For the actuators $e_1$, $f_1$, $e_2$, $f_2$, $e_3$ and $f_3$ of FIG. 8, $u_{en}$ and $u_{fn}$ (n=1, 2, 3) are driving force command values for generating the driving force of the force generation elements. Furthermore, $k_{en}$, $k_{fn}$, $b_{en}$ and $b_{fn}$ (n=1, 2, 3) are elastic force constants and viscous force constants of the artificial muscle actuators. Angles of the first and second links 201 and 202, i.e. angles of the joints, are defined as $\theta_1$ and $\theta_2$. Inertia moments of the first and second links 201 and 202 are defined as $I_1$ and $I_2$. Lengths of the first and second links 201 and 202 are defined as $2 \times l_1$ and $2 \times l_2$. Mass of the first and second links 201 and 202 is defined as $m_1$ and $m_2$.

A length of the moment arm diameter, i.e. a length between the pivot center point of the first link 201 and the connection point of the actuators $e_1$ and $f_1$ at the pulley 203 and a length between the pivot center point of the second link 202 and the connection point of the actuators $e_2$ and $f_2$ at the second link 202, is defined as r.

When the elastic force constants and the viscous force constants of the muscles are defined as k and b in the present third embodiment, equations of motion are as in the following Formulas (26) and (27).

$$(m_1 l_1^2 + I_1 + 4m_2 l_1^2 + 4m_2 l_1 l_2 \cos \theta_2 + m_2 l_2^2 + I_2)\ddot{\theta}_1 + \\ (m_2 l_2^2 + I_2 + 2m_2 l_1 l_2 \cos \theta_2)\ddot{\theta}_2 - 2m_2 l_2 l_2 (2\dot{\theta}_1 + \dot{\theta}_2)\sin \theta_2 \dot{\theta}_2 = (u_{f1} - u_{e1})r - (u_{f1} + u_{e1})kr^2 \theta_1 - (u_{f1} + u_{e1})br^2 \dot{\theta}_1 + \\ (u_{f3} - u_{e3})r - (u_{f3} + u_{e3})kr^2(\theta_1 + \theta_2) - (u_{f3} + u_{e3})br^2(\dot{\theta}_1 + \dot{\theta}_2)$$

(26)

$$(m_2 l_2^2 + I_2 + 2m_2 l_1 l_2 \cos \theta_2)\ddot{\theta}_2 + 2m_2 l_1 l_2 \sin 0_2 \dot{\theta}_1^2 = \\ (u_{f2} - u_{e2})r - (u_{f2} + u_{e2})kr^2 \theta_2 - (u_{f2} + u_{e2})br^2 \dot{\theta}_2 + \\ (u_{f3} - u_{e3})r - (u_{f3} + u_{e3})kr^2(\theta_1 + \theta_2) - (u_{f3} + u_{e3})br^2(\dot{\theta}_1 - \dot{\theta}_2)$$

(27)

(2) Control System Design

The trajectory control of the joint that minimizes the contractile force (driving force) are performed in the first and second embodiments, and a two-degree-of-freedom control system is designed in the present third embodiment.

Figure 9:
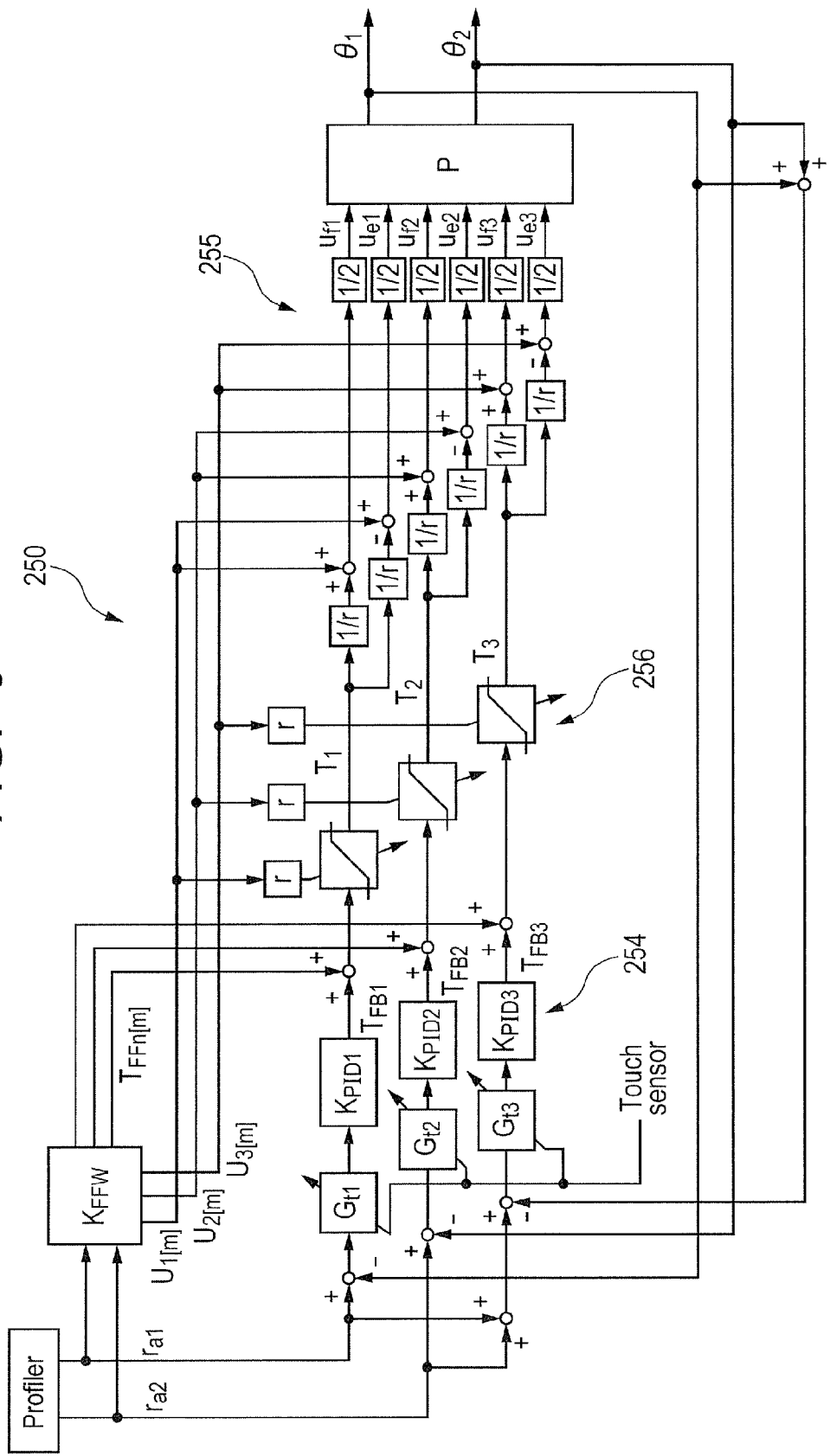
FIG. 9 is a block diagram of a control unit according to the third embodiment of the present invention.
Figure 10:
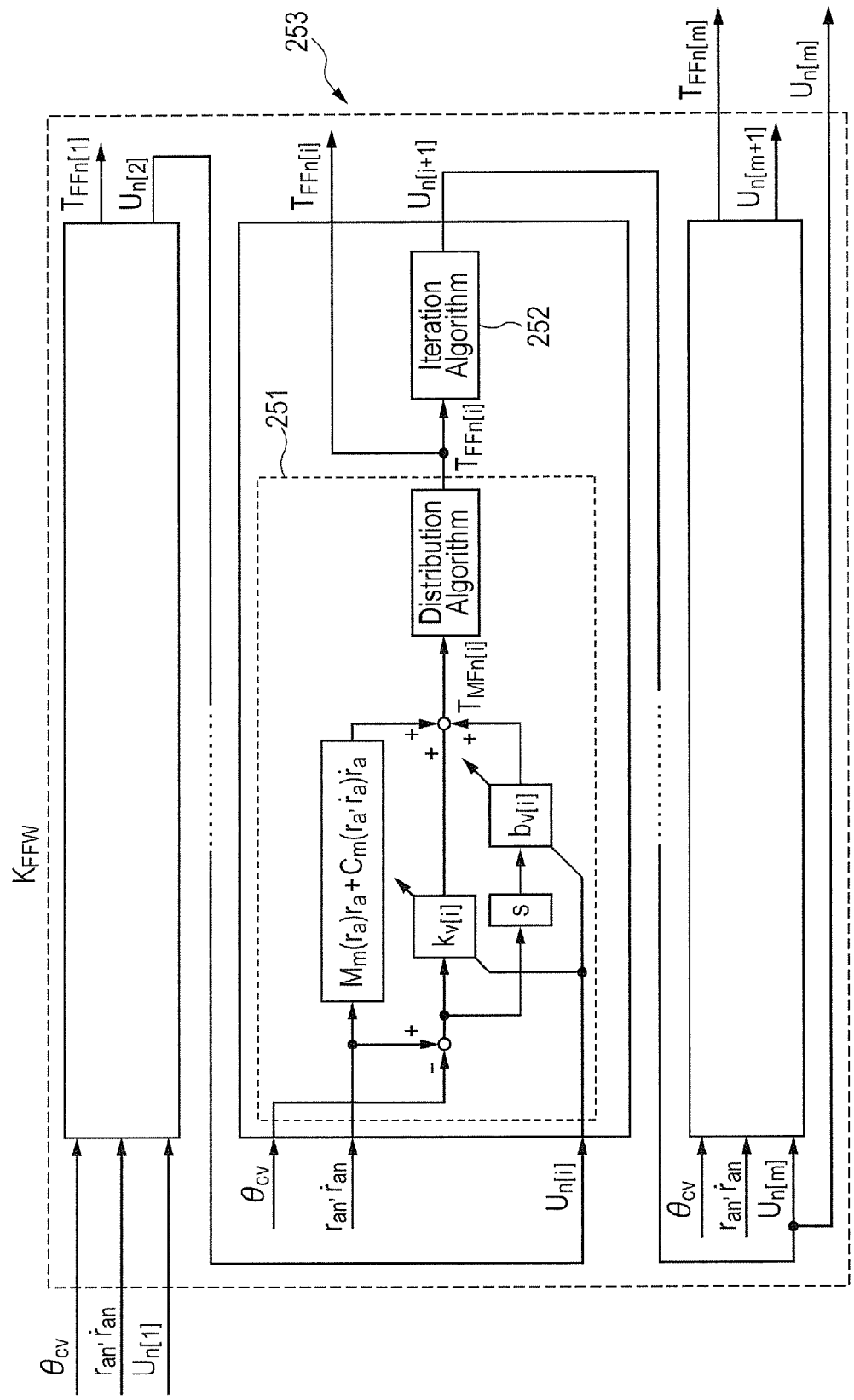
FIG. 10 is a block diagram of feedforward control of the control unit according to the third embodiment of the present invention.

FIG. 9 illustrates a block diagram of a control unit 250 of the present third embodiment. FIG. 10 shows a block diagram of the feedforward control. A block indicated by $K_{FFW}$ is the feedforward control system. The control unit 250 executes a torque command value computation step 251, a change computation step 252, an iterative step 253, a corrected torque command value computation step 254 and a driving force command value computation step 255. In the present third embodiment, the control unit 250 obtains driving force command values $u_{en}$ and $u_{fn}$ of the actuators $e_n$ and $f_n$ necessary for the angles of the joints 211 and 212 to follow the target trajectory. The control unit 250 controls the actuators $e_n$ and $f_n$ to cause the driving force generated in the actuators $e_n$ and $f_n$ to coincide with the driving force command values $u_{en}$ and $u_{fn}$.

(2.1) Feedforward Control System

When the difference in the driving force command values is defined as $T_n$ and the sum is defined as $U_n$ as in the first embodiment, the following can be formed.

$$(u_{fn}-u_{en})r=T_{FFn}+T_{FBn}=T_n, n=1,2,3 \tag{28}$$

$$u_{fn}+u_{en}=U_n, n=1,2,3 \tag{29}$$

Here, $T_{FFn}$ and $T_{FBn}$ denote torque command values provided by the feedforward control system and the feedback control system, respectively. In this section, $T_{FBn}=0$ is set to illustrate a delivery method of the feedforward control input.

When Formulas (26) and (27) are defined by $\theta_v=[\theta_1\ \theta_2]^T$ and $T_v=[T_1+T_3\ T_2+T_3]^T$ to write matrices, the following is formed.

$$M_m(\theta_v)\ddot{\theta}_v+C_m(\theta_v,\dot{\theta}_v)\dot{\theta}_v=-K_v(\theta_v-\theta_{cv})-C_v\dot{\theta}_v+T_v \tag{30}$$

Here, $K_v$ and $C_v$ denote a stiffness matrix and a damping matrix based on the viscoelasticity of muscle, respectively, and are expressed as follows.

$$K_v = \begin{bmatrix} U_1+U_3 & U_3 \\ U_3 & U_2+U_3 \end{bmatrix} kr^2, C_v = \begin{bmatrix} U_1+U_3 & U_3 \\ U_3 & U_2+U_3 \end{bmatrix} br^2 \tag{31}$$

Furthermore, $\theta_{cv}$ denotes a vector including neutral posture angles $\theta_{c1}$ and $\theta_{c2}$ based on the elastic force of muscle when the joint torque $T_1$ and $T_2$ do not act and is expressed as follows.

$$\theta_{cv}=[\theta_{c1}\ \theta_{c2}]^T \tag{32}$$

The target trajectory relative to the joint angle $\theta_n$ (n=1, 2) is defined as $r_{an}$ (n=1, 2) to define as follows.

$$r_{av}=[r_{a1}\ r_{a2}]^T \tag{33}$$

The angular velocity and the angular acceleration of the target trajectory are expressed as follows, respectively.

A feedforward torque command value necessary for the joint angle to follow the target trajectory is expressed by $T_{FFv}=[T_{FF1}+T_{FF3}\ T_{FF2}+T_{FF3}]^T$. The torque command value $T_{FFv}$ can be expressed as follows based on inverse dynamics of the link.

$$T_{FFv}=M_m(r_{av})\ddot{r}_{av}+C_m(r_{av},\dot{r}_{av})\dot{r}_{av}+K_v(r_{av}-\theta_{cv})+C_v\dot{r}_{av} \tag{34}$$

However, the number of control inputs of the manipulator with the bi-articular simultaneous drive actuators is redundant relative to the controlled degree of freedom. Therefore, although torque command values relative to each joint 211 and 212 (hereinafter, abbreviated "each joint torque") can be obtained based on inverse dynamics, commands $T_{FFn}$ (n=1, 2, 3) including the torque by the bi-articular drive actuators cannot be uniquely determined. Thus, the joint torque command obtained from the right side of Formula (34) is defined as $T_{MF}=[T_{MF1}\ T_{MF2}]^T$, and each joint torque command $T_{MF}$ is distributed to minimize the following maximum values of the absolute values of $T_{FFn}$ (n=1, 2, 3).

$$\max(|T_{FFn}|, n=1,2,3) \tag{35}$$

The relationship between $T_{MF}$ and $T_{FFn}$ (n=1, 2, 3) is as in the following Formulas (36) and (37).

$$T_{FF1}+T_{FF3}=T_{MF1} \tag{36}$$

$$T_{FF2}+T_{FF3}=T_{MF2} \tag{37}$$

If $T_{MF1}$ and $T_{MF2}$ have the same signs, $T_{FF3}$ can be increased or decreased to increase or decrease $T_{FF1}$ and $T_{FF2}$ by the amount of change in $T_{FF3}$ based on Formulas (36) and (37). If $T_{MF1} \leq T_{MF2}$, $T_{FF3}$ can be gradually increased or decreased from 0 to set $T_{FF1}=T_{FF3}$. In this case $T_{FFn}$ (n=1, 2, 3) can be calculated as follows.

$$T_{FF1}=\frac{T_{MF1}}{2}, F_{FF2}=\frac{2T_{MF2}-T_{MF1}}{2}, T_{FF3}=\frac{T_{MF1}}{2} \tag{38}$$

On the other hand, if $T_{MF2}>T_{MF1}$, $T_{FF2}=T_{FF3}$ can be set, and $T_{FFn}$ (n=1, 2, 3) can be calculated as follows.

$$T_{FF1}=\frac{2T_{MF1}-T_{MF2}}{2}, T_{FF2}=T_{FF3}=\frac{T_{MF2}}{2} \tag{39}$$

If $T_{MF1}$ and $T_{MF2}$ have different signs, for example, although an increase in $T_{FF3}$ reduces the absolute value of $T_{FF1}$, the absolute value of $T_{FF2}$ increases. Therefore, $T_{FF1}$ and $T_{FF2}$ can be set as follows.

$$|T_{FF1}|=|T_{FF2}| \tag{40}$$

If $T_{MF1}$ and $T_{MF2}$ have different signs, and Formula (40) is satisfied, $T_{FF1}$ and $T_{FF2}$ have different signals. Therefore, the following can be obtained based on Formulas (36), (37) and (40).

$$T_{FF1}=\frac{T_{MF1}-T_{MF2}}{2}, T_{FF2}=\frac{-T_{MF1}+T_{MF2}}{2},$$
$$T_{FF3}=\frac{T_{MF1}+T_{MF2}}{2} \tag{41}$$

This can be used to obtain, based on the iterative computation algorithm, the torque command value $T_{FFn}$ and the joint stiffness command value $U_n$ that satisfy the following condition of generating the force only in the contraction direction, as in the first embodiment.

$$|T_{FFn}|<U_n r, n=1,2,3 \tag{42}$$

As in the first embodiment, the number of iterations is defined as i in the present third embodiment, and the torque command values $T_{FFn}$ and the joint stiffness command values $U_n$ based on iterative computations of i times are written as follows.

$$T_{FFn[i]}, U_{n[i]}, n=1,2,3 \tag{43}$$

A stiffness matrix and a damping matrix based on the viscoelasticity of muscle including $U_{n[i]}$ as elements will be written as $K_{v[i]}$ and $C_{v[i]}$ In the torque command value computation step 251, the control unit 250 uses the target trajectory, the angular velocity of the target trajectory, the angular acceleration of the target trajectory, and the joint stiffness command value to compute the torque command values $T_{FFn[F]}$ indicating the torque necessary for the joints 211 and 212, based on inverse dynamics of the links 201 and 202. More specifically, the control unit 250 computes the torque command value $T_{FFn[i]}$ of an i-th iteration based on Formula (44) (torque command value computation step).

$$T_{MFn[i]} = M_m(r_{av})\ddot{r}_{av} + C_m(r_{av},\dot{r}_{av})\dot{r}_{av} + K_{v[i]}(r_{av}-\theta_{cv}) + C_{v[i]}\dot{r}_{av} \quad (44)$$

The control unit 250 distributes Formula (44) based on the method illustrated in Formulas (38) to (41) to calculate $T_{FFn[i]}$ (n=1, 2, 3)

In the change computation step 252, the control unit 250 computes a difference between the joint stiffness command value $U_{n[i]}$ and a value $|T_{FFn[i]}|/r$ obtained by dividing the absolute value of the torque command value $T_{FFn[i]}$ by the moment arm radius r of the link. The difference is defined as $E_{n[i]}$, and the control unit 250 computes the difference $E_{1[i]}$ based on the following Formula (45).

In the present third embodiment, the stiffness lower limit relative to the joint stiffness command value $U_n$ is defined as $V_n$, and the difference $E_{n[i]}$ relative to the condition of Formula (42) is defined as follows.

$$E_{n[i]} = U_{n[i]} - |T_{FFn[i]}|/r - V_n, n=1,2,3 \quad (45).$$

In the change computation step 252, the control unit 250 performs a computation of subtracting a value, which is obtained by multiplying the difference $E_{n[i]}$ by a convergence factor γ greater than 0 and equal to or smaller than 1, from the joint stiffness command value $U_{n[i]}$ to change the joint stiffness command value $U_{n[i]}$ (change computation step). More specifically, the control unit 250 sets the convergence factor γ of the iterative computation algorithm to 0<γ≤1 to calculate an i+1-th joint stiffness command value $U_{n[i|1]}$ based on the following Formula (46)

$$U_{n[i+1]} = U_{n[i]} - \gamma E_{n[i]}, n=1,2,3 \quad (46)$$

In the iterative step 253, the control unit 250 iterates the computations of Formulas (44) to (46) for a predetermined number of times m until the difference $E_{n[i]}$ converges to equal to or smaller than a predetermined value (for example, 0) (iterative step).

In a block of "Distribution Algorithm" illustrated in FIG. 10, the distribution algorithm illustrated in Formulas (38) to (41) is executed. In a block of "Iteration Algorithm", the iterative computation algorithm of Formulas (44) to (46) is executed.

The driving force command value computation step 255 (FIG. 9) in the case of only the feedforward control (i.e. when $T_{FBn}=0$) will be described. The torque command value is $T_n = T_{FFWn}$.

In the driving force command value computation step 255 after the end of the iterative step 253, the control unit 250 uses the joint stiffness command value $U_{n[m]}$ and the torque command value $T_{n[m]}$ to compute the driving force command values $u_{en}$ and $u_{fn}$ for computing the driving force command values (driving force command value computation step). As a result, the torque corresponding to the torque command values $T_n$ is applied to the joints 211 and 212, and the angles $\theta_1$ and $\theta_2$ of the joints 211 and 212 follow the target trajectory.

(2.2) Two-Degree-of-Freedom Control System

When the feedback control is also performed along with the feedforward control, the control unit 250 executes PID control steps $K_{PID1}$ to $K_{PID3}$ illustrated in FIG. 9 in the corrected torque command value computation step 254 (corrected torque command value computation step).

The control unit 250 uses, as the torque command value $T_n$, a result obtained by adding the control input torque $T_{FBn}$ to the feedforward input $T_{FFn}$. In this case, the control unit 250 applies a restriction based on Formula (30) in the restriction step 256 as in the second embodiment and calculates the contractile force $u_{fn}$ and $u_{en}$.

Specifically, the control unit 250 computes the control input torque $T_{FB1}$ and $T_{FB2}$ for compensating the difference between the joint angles $\theta_1$, $\theta_2$, and the target trajectories $r_{a1}$, $r_{a2}$ in the PID control steps $K_{PID1}$ and $K_{PID2}$ as the feedback control system illustrated in FIG. 9. In the PID control step $K_{PID3}$, the control unit 250 computes control input torque $T_{FB3}$ for compensating the difference between the joint angles $\theta_1+\theta_2$ and the target trajectories $r_{a1}+r_{a2}$.

As in the second embodiment, the control input $T_n$ (n=1, 2, 3) is restricted as follows.

$$|T_n| < U_n r, n=1,2,3 \quad (47)$$

The driving force command value $u_{fn}$ and $u_{en}$ (n=1, 2, 3) is expressed as follows.

$$u_{fn} = \frac{U_n + T_n/r}{2}, u_{en} = \frac{U_n - T_n/r}{2} \quad (48)$$

(2.3) Hand Stiffness Control

Figure 11:
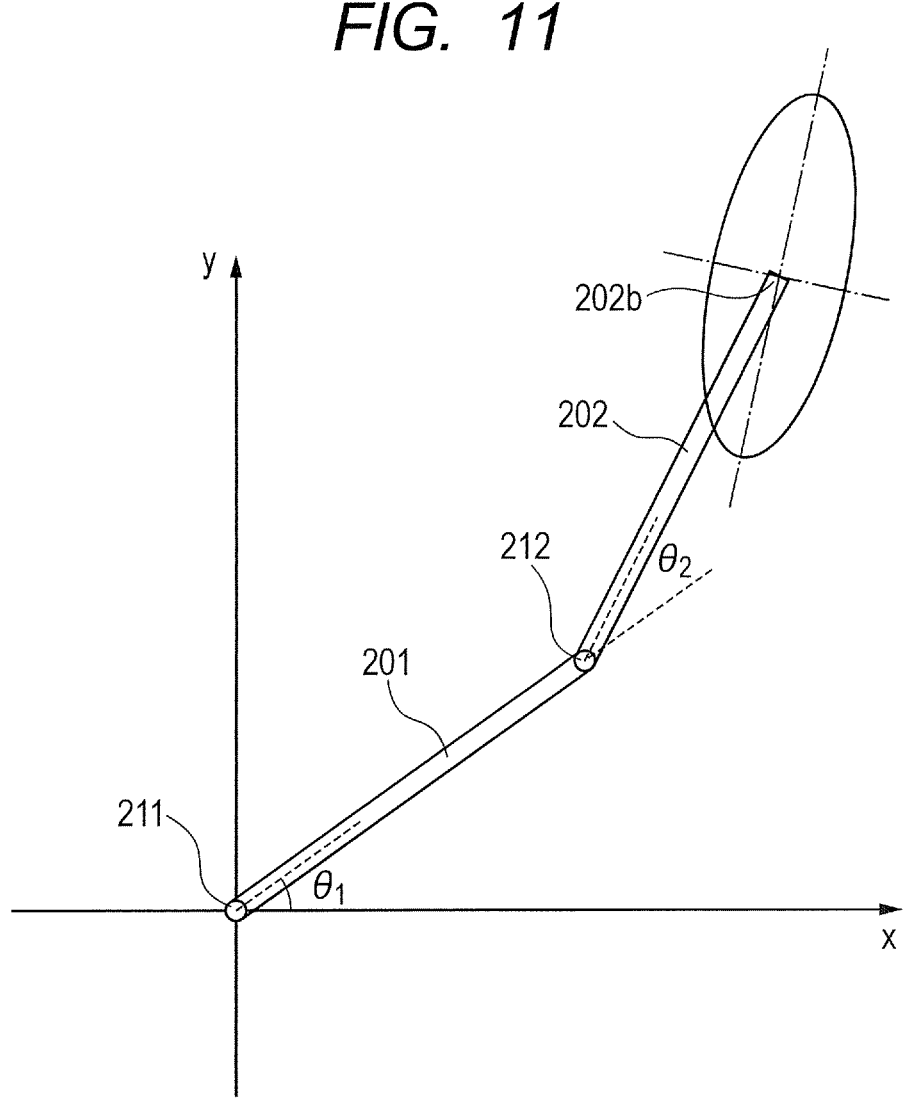
FIG. 11 is a diagram for describing a stiffness ellipse according to the third embodiment of the present invention.
Figure 12:
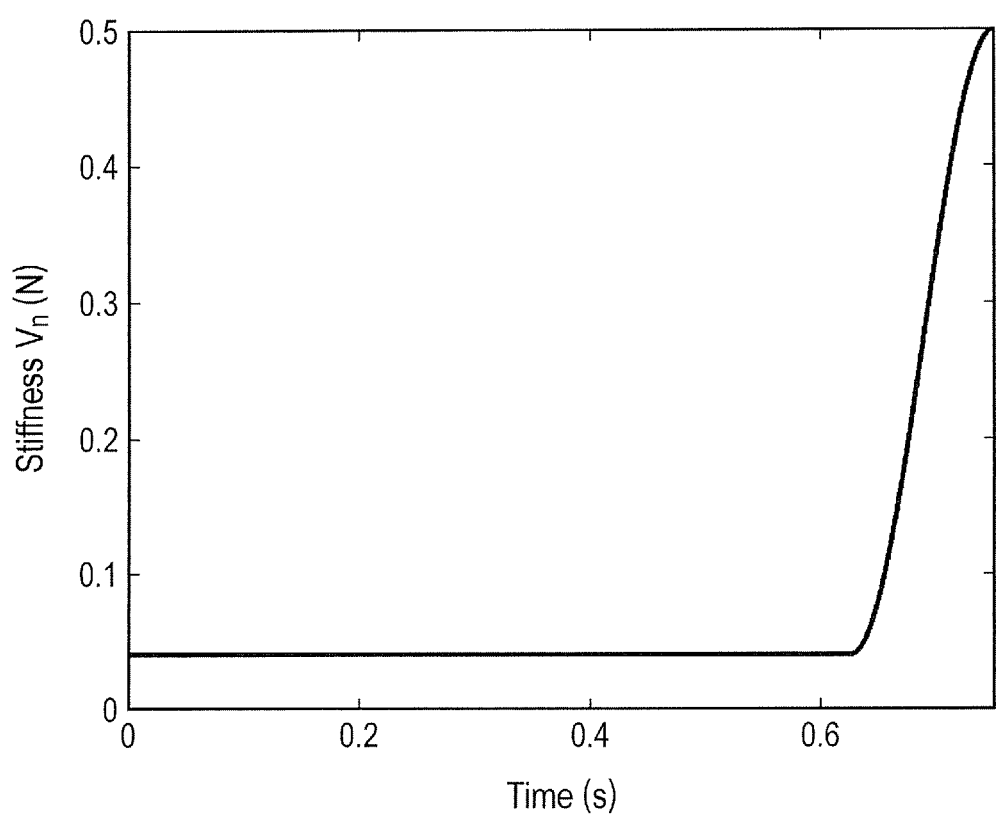
FIG. 12 is a diagram illustrating a trajectory design according to the third embodiment of the present invention.

Since the hand directly touches the outside world in the two-link manipulator, the control of the stiffness of the hand is important. The stiffness of the hand is expressed by a stiffness ellipse as illustrated in FIG. 11. The ellipse illustrates a distribution of the stiffness relative to each direction. The greater the distance between the hand and the ellipse, the higher the stiffness. In the one-link manipulator of the first embodiment, the stiffness of the joint and the stiffness of the hand are the same. In the two-link manipulator with six muscles (three pairs) of the present third embodiment, the stiffness of the hand is obtained by controlling the joint stiffness command values $U_1$, $U_2$ and $U_3$. For example, if the joint stiffness command values $U_1$, $U_2$ and $U_3$ are controlled by $$U_1 = U_2 = U_3 \quad (49),$$

it is known that the major axis of the stiffness ellipse faces the direction connecting the first joint and the hand. Since the computation of the stiffness is iterated to minimize the contractile force in the present third embodiment, the stiffness during the drive cannot be arbitrarily designated. However, the hand stiffness can be controlled at the target position of the hand. In the present third embodiment, the lower limit of the joint stiffness command value is changed as illustrated in FIG. 12, and the stiffness is controlled to satisfy Formula (49) at the target position of the hand.

(2.4) Trajectory Design

In the present third embodiment, the target trajectory is set to drive the hand forward on the y axis of FIG. 8. As in the first embodiment, the acceleration section, the constant velocity section, and the deceleration section are included. The target trajectories $r_{a1}$ and $r_{a2}$ relative to the joint angle are obtained from the hand trajectory based on inverse kinematics. Although the trajectory including the acceleration section, the constant velocity section and the deceleration section is used in the present third embodiment, a trajectory, such as a minimum jerk trajectory, that does not include the constant velocity section may also be used.

(3) Simulation

A simulation using the control system of the previous section is performed. The physical parameters of the first link 201 and the second link 202 are the same. The link length is 0.2 m, the inertia moment of the link is $I_1=I_2=1.3\times 10^{-3}$ kgm$^2$, the moment arm diameter is 0.05 m, and the elastic force and viscous force constants are k=12 and b=0.003. For the target trajectory, the start time of the constant velocity section is $t_a$=0.2747 sec, the end time of the constant velocity section is $t_b$=0.4746 sec, and the positioning end time is $t_f$=0.75 sec. The neutral posture angles $\theta_{c1}$ and $\theta_{c2}$ based on the elastic force when the joint torque does not act are joint angles at the halfway point of the hand trajectory, which are $\theta_{c1}$=29.7 deg and $\theta_{c2}$2=120.7 deg. As in the second embodiment, verification for the identification error of the model in the two-degree-of-freedom control system is performed in the present first embodiment. Therefore, the inertia moments are defined as $I_1$ and $I_2$ in the generation of the feedforward input. In the simulation, the inertial moments of the links are $I_1'$=1.1$I_1$ and $I2'$=1.05$I_2$.

Figure 13A:
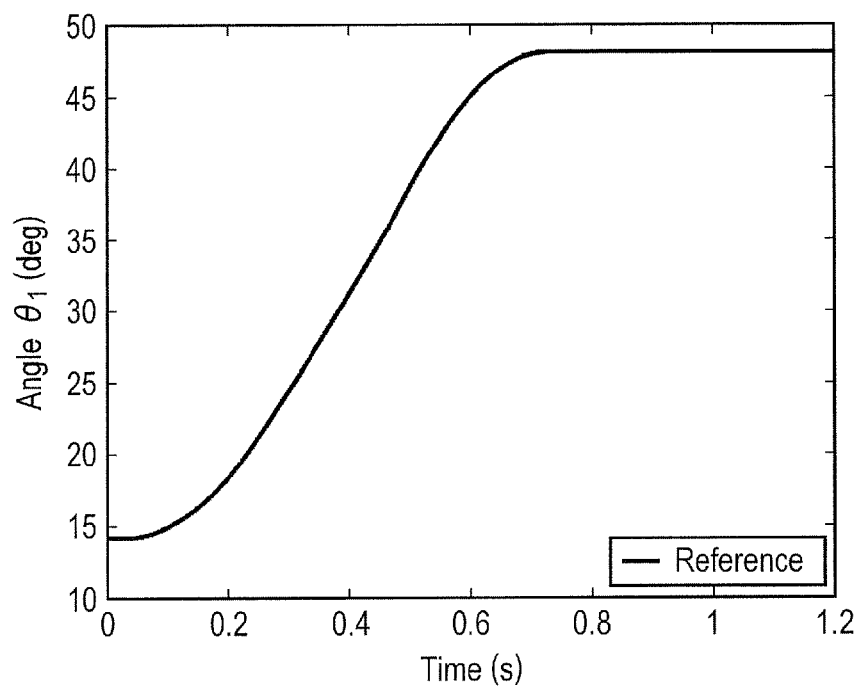
FIG. 13A is a diagram illustrating a simulation result according to the third embodiment of the present invention.
Figure 13B:
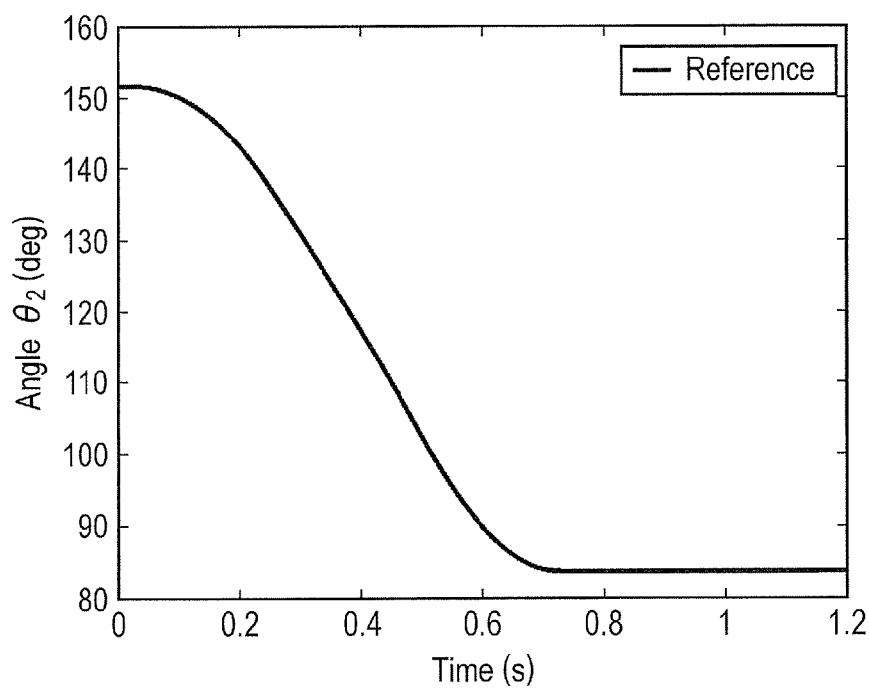
FIG. 13B is a diagram illustrating a simulation result according to the third embodiment of the present invention.
Figure 14A:
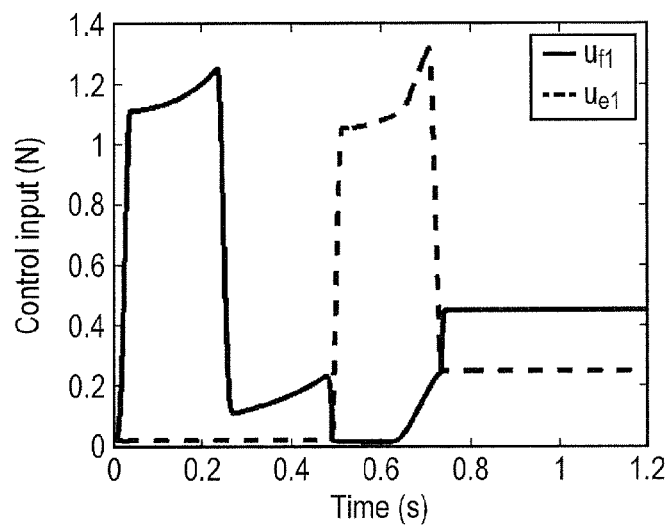
FIG. 14A is a diagram illustrating a simulation result according to the third embodiment of the present invention.
Figure 14B:
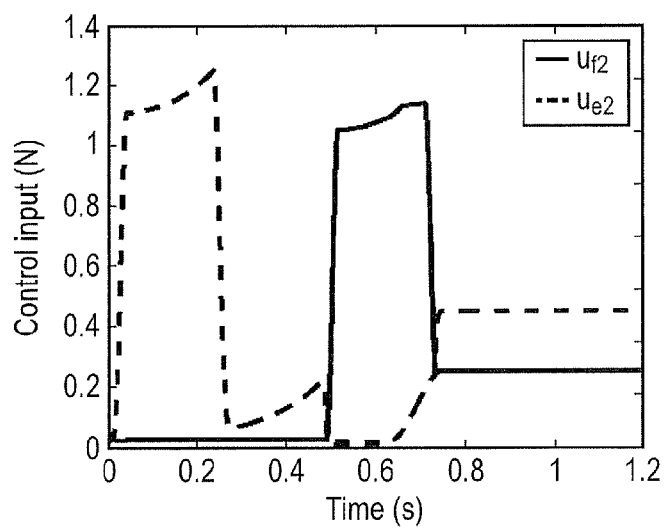
FIG. 14B is a diagram illustrating a simulation result according to the third embodiment of the present invention.
Figure 14C:
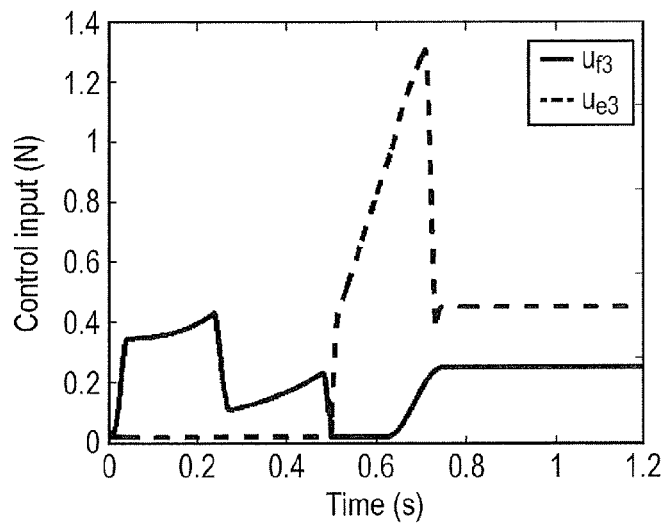
FIG. 14C is a diagram illustrating a simulation result according to the third embodiment of the present invention.
Figure 15A:
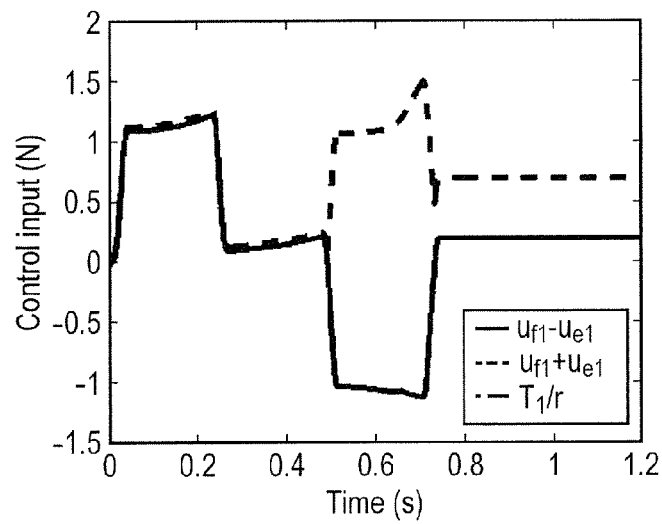
FIG. 15A is a diagram illustrating a simulation result according to the third embodiment of the present invention.
Figure 15B:
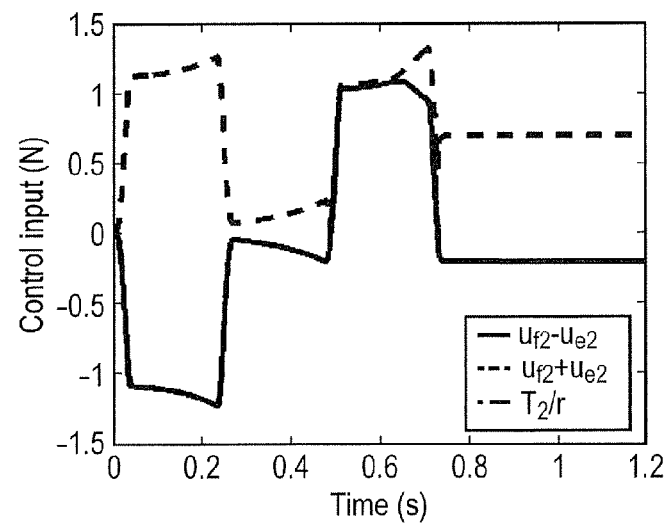
FIG. 15B is a diagram illustrating a simulation result according to the third embodiment of the present invention.
Figure 15C:
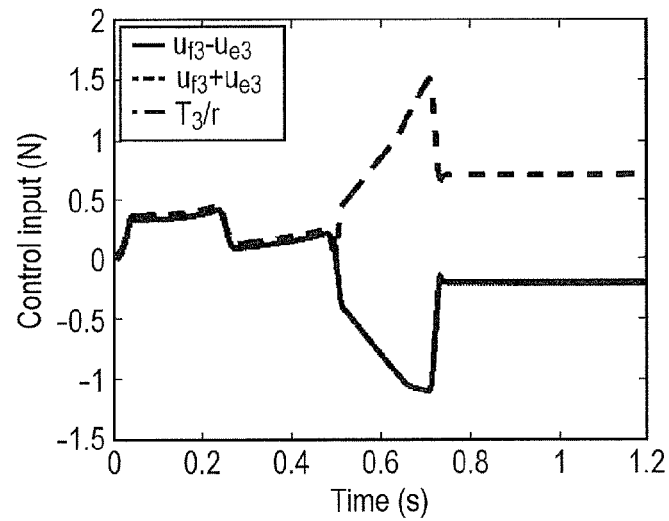
FIG. 15C is a diagram illustrating a simulation result according to the third embodiment of the present invention.
Figure 16:
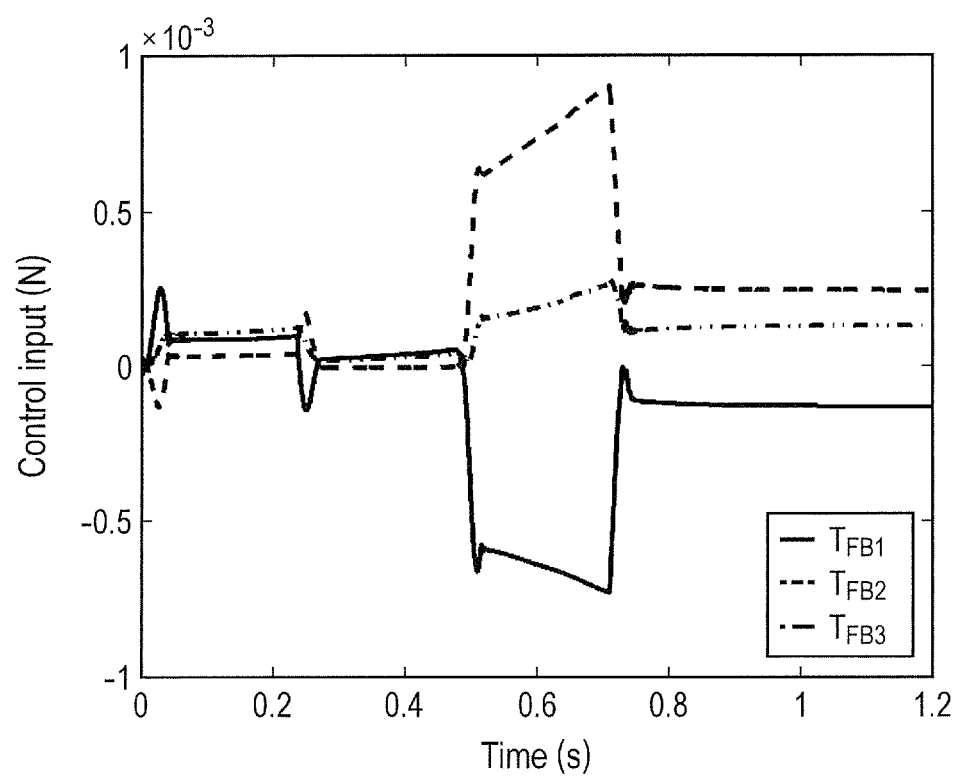
FIG. 16 is a diagram illustrating a simulation result according to the third embodiment of the present invention.

FIGS. 13A and 13B illustrate the joint angles $\theta_1$ and $\theta_2$ of the first and second links by solid lines and illustrate the target trajectories $r_{a1}$ and $r_{a2}$ by dashed lines. FIGS. 14A to 14C illustrate responses of the driving force command value $u_{f1}$, $u_{f2}$ and $u_{f3}$ by solid lines and illustrate responses of the driving force command value $u_{e1}$, $u_{e2}$ and $u_{e3}$ by dashed lines. FIGS. 15A to 15C illustrate differences in the driving force command value $u_{en}$ and $u_{fn}$ (n=1, 2, 3) by solid lines, sums by dashed lines, and responses of $T_n/r$ (n=1, 2, 3) by alternate long and short dash lines. FIG. 16 illustrates $T_{FB1}$, $T_{FB2}$ and $T_{FB3}$ by solid lines, dashed lines and alternate long and short dash lines, respectively.

It can be recognized from FIGS. 13A and 13B that the joint angles indicated by the solid lines overlap with the trajectories indicated by the dashed lines and that the links follow the target trajectories. As in the second embodiment, this is because the feedback control input compensates the model errors as illustrated in FIG. 16. It can be recognized from FIG. 14A that the driving force command value $u_{e1}$ and $u_{f1}$ satisfy the characteristic that the contractile force of the artificial muscle is a positive value, because the control input $T_1$ of the two-degree-of-freedom control system is distributed based on the conditions illustrated in Formulas (47) and (48). It can be recognized from FIGS. 14B and 14C that the driving force command value $u_{e2}$, $u_{f2}$, $u_{e3}$ and $u_{f3}$ similarly indicates positive values.

In FIG. 15A, $u_{f1}-u_{e1}$ indicated by the solid line overlaps with $T_1/r$ indicated by the alternate long and short dash line, and the condition of Formula (28) is satisfied. Similarly, $U_2$ and $U_3$ indicated by solid lines overlap with $T_2/r$ and $T_3/r$ indicated by alternate long and short dash line in FIGS. 15B and 15C. In FIGS. 15A to 15C, $u_{f1}+u_{e1}=U_1$, $u_{f2}+u_{e2}=U_2$, $u_{f3}+u_{e3}=U_3$ indicated by dashed lines are in the proximity of the absolute values of $T'_1r$ indicated by solid lines in sections where $V_n$ (n=1, 2, 3) at 0 to 0.625 seconds set in FIG. 12 is close to 0. It can be recognized from this that the minimum value is always set in the range satisfying the restriction of Formula (47) as in the first and second embodiments. Subsequent to 0.65 seconds at which $V_n$ increases, the stiffness of each antagonistic pair is shifted to a larger value relative to the absolute value of $T'_1/r$ (n=1, 2, 3). Therefore, it can be recognized that the stiffness ellipse of the hand is controlled to satisfy the condition of Formula (49) in the target trajectory. According to the proposed method of the present third embodiment, it can be recognized that the stiffness of the hand can be controlled at the target position by the elasticity of six muscles (three pairs) while realizing the following of the target trajectory with the minimum contractile force, even if there is an identification error in the model.

The present invention is not limited to the embodiments described above, and a person with an ordinary skill in the field can make many modifications within the technical scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-028614, filed Feb. 13, 2012, which is hereby incorporated by reference herein in its entirety.

What is claimed is:

1. A robot apparatus comprising:
   a link pivotally connected to a base body via a joint and having an arm;
   a pair of actuators that generate driving forces for pulling the link in mutually opposite directions relative to the base body; and
   a control unit configured to control the driving forces of the pair of actuators in accordance with a stiffness command value representing a target stiffness of the link and a torque command value representing a target torque value of the link,
   wherein the control unit determines, through iterative calculations, a stiffness command value and a torque command value that satisfy a relationship where the stiffness command value is greater than the absolute value of the torque command value divided by a length of the arm.

2. The robot apparatus according to claim 1, wherein the iterative calculations include iterating computations of a torque command value computation process and a change computation process until the difference between the two converges to a value equal to or smaller than a predetermined value,
   wherein the torque command value computation process includes using a target trajectory, an angular velocity of the target trajectory, an angular acceleration of the target trajectory, and a joint stiffness command value to calculate the torque command value, and
   wherein the change computation process includes computing a difference between the joint stiffness command value and a first value, which is obtained by dividing an absolute value of the torque command value by a moment arm radius of the link, and performing a computation of subtracting a second value, which is obtained by multiplying the difference between the joint stiffness value and the first value by a coefficient greater than 0 and equal to or smaller than 1, from the joint stiffness command value to change the joint stiffness command value.

3. The robot apparatus according to claim 2, wherein the control unit computes a corrected torque command value for compensating a difference between the angle of the joint and a target trajectory, and in computing a driving force command value for controlling the target driving force, uses a result obtained by adding the corrected torque command value obtained in the corrected torque command value computation process to the torque command value obtained in the torque command value computation process as the torque command value used for the computation of each of the driving force command values.

4. The robot apparatus according to claim 1, wherein the driving forces determined by the control unit in accordance with the stiffness command value and the target stiffness command value are possible minimum values.

5. The robot apparatus according to claim 1, wherein the base body is a pivotable link.

6. The robot apparatus according to claim 5, further comprising two pairs of actuators configured to effect contraction forces on the link and the pivotable link such that they rotate in opposite directions.

7. A method for controlling a robot apparatus comprising a link pivotally connected to a base body via a joint and having an arm, and a pair of actuators that generate driving forces for pulling the link in mutually opposite directions relative to the base body, the method comprising
  a determining step of determining, through iterative computations, a stiffness command value and a torque command value that satisfy a relationship where the stiffness command value is greater than the absolute value of the torque command value divided by a length of the arm; and
  a controlling step of controlling the driving forces of the pair of actuators in accordance with the stiffness command value representing a target stiffness of the link and the torque command value representing a target torque value of the link.

8. The method according to claim 7 wherein the iterative calculations include iterating computations of a torque command value computation process and a change computation process until the difference between the two converges to a value equal to or smaller than a predetermined value,
  wherein the torque command value computation process includes using a target trajectory, an angular velocity of the target trajectory, an angular acceleration of the target trajectory, and a joint stiffness command value to calculate the torque command value, and
  wherein the change computation process includes computing a difference between the joint stiffness command value and a first value, which is obtained by dividing an absolute value of the torque command value by a moment arm radius of the link, and performing a computation of subtracting a second value, which is obtained by multiplying the difference between the joint stiffness command value and the first value by a coefficient greater than 0 and equal to or smaller than 1, from the joint stiffness command value to change the joint stiffness command value.

9. The method according to claim 8, wherein the controlling step further comprises computing a corrected torque command value for compensating a difference between the angle of the joint and a target trajectory, and in computing a driving force command value for controlling the target driving force, uses a result obtained by adding the corrected torque command value obtained in the corrected torque command value computation process to the torque command value obtained in the torque command value computation process as the torque command value used for the computation of each of the driving force command values.

10. The method according to claim 7, wherein the driving forces determined in accordance with the stiffness command value and the target stiffness command value are possible minimum values.

11. The method according to claim 7, wherein the base body is a pivotable link.

12. The method according to claim 11, wherein said robot apparatus further comprises two pairs of actuators configured to effect contraction forces on the link and the pivotable link such that they rotate in opposite directions.

* * * * *